United States Patent [19]
Miyauchi

[11] Patent Number: 6,115,045
[45] Date of Patent: Sep. 5, 2000

[54] INFORMATION PROCESSING SYSTEM AND A NETWORK TYPE INFORMATION PROCESSING SYSTEM

[75] Inventor: Nobuhito Miyauchi, Tokyo, Japan

[73] Assignee: Mitsubishi Denki Kabushiki Kaisha, Tokyo, Japan

[21] Appl. No.: 08/962,320

[22] Filed: Oct. 31, 1997

[30] Foreign Application Priority Data

Jan. 13, 1997 [JP] Japan .................................. 9-004051

[51] Int. Cl.⁷ .................................................. G06T 17/00
[52] U.S. Cl. .......................................... 345/418; 345/419
[58] Field of Search .................................. 345/418, 419, 345/420, 423, 424

[56] References Cited

U.S. PATENT DOCUMENTS

| | | | |
|---|---|---|---|
| 4,944,034 | 7/1990 | Obsawa | 364/522 |
| 5,515,491 | 5/1996 | Bates et al. | 395/155 |
| 5,548,694 | 8/1996 | Grisken Gibson | 345/424 |

*Primary Examiner*—Phu K. Nguyen
*Assistant Examiner*—Cliff N. Vo

[57] ABSTRACT

An information processing system and a network type information processing system allows descriptions regarding the geometry motion and sound associated with a virtual three dimensional object to be modified. The information processing system includes an input device for receiving object data, a control device for extracting a plurality of data units from the description object data for every element, and generating linked data in each of the plurality of data units which link the plurality of data units to each other, a storage device for recording the linked data units, and an output device for outputting the object based on the plurality of data units recorded in the storage device.

29 Claims, 41 Drawing Sheets

FIG. 2A

| ATTRIBUTE | ATTRIBUTE VALUE |
|---|---|
| DATA IDENTIFIER | 3479890 |
| DATA TYPE | 3 DIMENSIONAL MODEL DATA |
| X COORDINATE POSITION | 100.0 |
| Y COORDINATE POSITION | 150.0 |
| Z COORDINATE POSITION | 80.0 |
| SHAPE TYPE | CYLINDER |
| ⋮ | ⋮ |

FIG. 2B

| ATTRIBUTE | ATTRIBUTE VALUE |
|---|---|
| DATA IDENTIFIER | 783002 |
| DATA TYPE | SOUND SOURCE DATA |
| X COORDINATE POSITION | 100.0 |
| Y COORDINATE POSITION | 150.0 |
| Z COORDINATE POSITION | 80.0 |
| SOUND SOURCE TYPE ATTRIBUTE | ENVIRONMENTAL SOUND |
| ⋮ | ⋮ |

FIG. 2C

| ATTRIBUTE | ATTRIBUTE VALUE |
|---|---|
| DATA IDENTIFIER | 45029 |
| DATA TYPE | TEXT DATA |
| DATA IDENTIFIER OF LINKED DESTINATION | 347890 |
| TEXT DATA FILE NAME | C:¥DOC¥TEXT 01.txt |
| ⋮ | ⋮ |

FIG. 2D

| ATTRIBUTE | ATTRIBUTE VALUE |
|---|---|
| DATA IDENTIFIER | 1544029 |
| DATA TYPE | TEXT MAPPING IMAGE |
| DATA IDENTIFIER OF LINKED DESTINATION | 347890 |
| IMAGE DATA FILE NAME | C:¥IMAGE¥txpat.gif |
| ⋮ | ⋮ |

FIG. 4A

| OBJECT DATA IDENTIFIER | COMMUNICATION PROCESSING TYPE OF TERMINAL |
|---|---|
| A | CLIENT SERVER TYPE |
| B | CLIENT SERVER TYPE |
| C | PERFECT DISTRIBUTION TYPE |
| D | CLIENT SERVER TYPE |
| E | PERFECT DISTRIBUTION TYPE |
| F | PERFECT DISTRIBUTION TYPE |
| ....... | ....... |

FIG. 4B

| OBJECT DATA IDENTIFIER | TERMINAL IDENTIFIER WITH DATA |
|---|---|
| A | 1 |
| B | 3 |
| C | 3 |
| D | 3 |
| E | 4 |
| F | 1 |
| ....... | ....... |

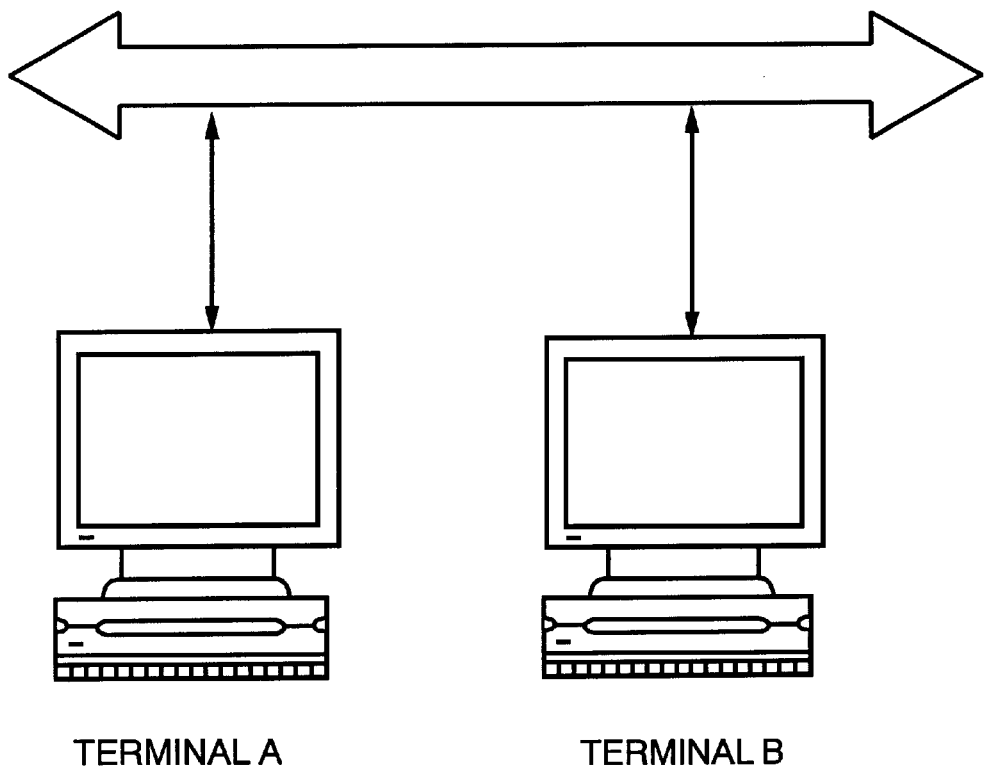
TERMINAL A	TERMINAL B
FIG. 6A
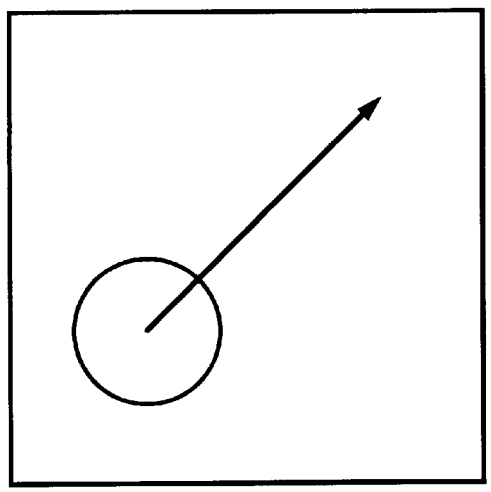 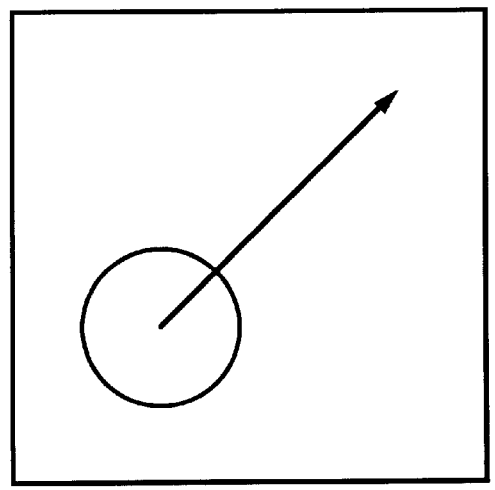
FIG. 6B	FIG. 6C

FIG. 7A

| OBJECT DATA IDENTIFIER | COMMUNICATION PROCESSING TYPE OF TERMINAL |
|---|---|
| A | CLIENT SERVER TYPE |
| B | CLIENT SERVER TYPE |
| C | PERFECT DISTRIBUTION TYPE |
| D | CLIENT SERVER TYPE |
| E | PERFECT DISTRIBUTION TYPE |
| F | PERFECT DISTRIBUTION TYPE |
| ⋯⋯ | ⋯⋯ |

FIG. 7B

| OBJECT DATA IDENTIFIER | SYNCHRONIZING SYSTEM OF TERMINAL |
|---|---|
| A | OBJECT INFORMATION MODIFYING CALCULATION |
| B | SYNCHRONIZING COMMUNICATION REQUEST MANAGEMENT |
| C | OBJECT INFORMATION MODIFYING CALCULATION |
| D | DATA MODIFICATION PROCESSING INFORMATION COMMUNICATION |
| E | SYNCHRONIZING COMMUNICATION REQUEST MANAGEMENT |
| F | DATA MODIFICATION PROCESSING INFORMATION COMMUNICATION |
| ⋯⋯ | ⋯⋯ |

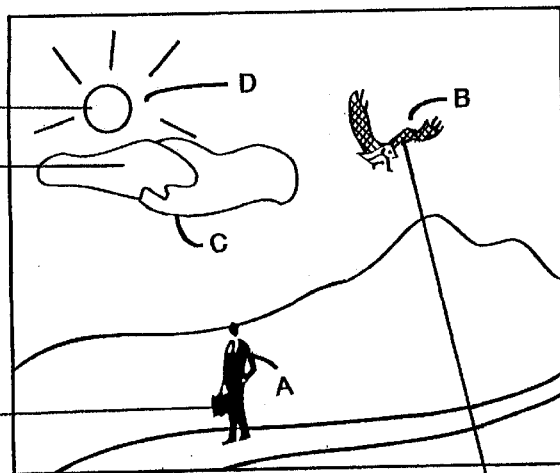

FIG. 10A

| ATTRIBUTE | ATTRIBUTE VALUE |
|---|---|
| DATA TYPE | THREE DIMENSIONAL MODEL DATA |
| DATA IDENTIFIER | 732901 |
| OBJECT NAME | HUMAN BEING |
| LEVEL FOR REAL TIME RESPONSE | 50 |
| ⋮ | ⋮ |

| ATTRIBUTE | ATTRIBUTE VALUE |
|---|---|
| DATA TYPE | THREE DIMENSIONAL MODEL DATA |
| DATA IDENTIFIER | 74910 |
| OBJECT NAME | CONDOR |
| LEVEL FOR REAL TIME RESPONSE | 100 |
| ⋮ | ⋮ |

| ATTRIBUTE | ATTRIBUTE VALUE |
|---|---|
| DATA TYPE | THREE DIMENSIONAL MODEL DATA |
| DATA IDENTIFIER | 400380 |
| OBJECT NAME | CLOUD |
| LEVEL FOR REAL TIME RESPONSE | 500 |
| ⋮ | ⋮ |

| ATTRIBUTE | ATTRIBUTE VALUE |
|---|---|
| DATA TYPE | THREE DIMENSIONAL MODEL DATA |
| DATA IDENTIFIER | 219602 |
| OBJECT NAME | SUN |
| LEVEL FOR REAL TIME RESPONSE | 2000 |
| ⋮ | ⋮ |

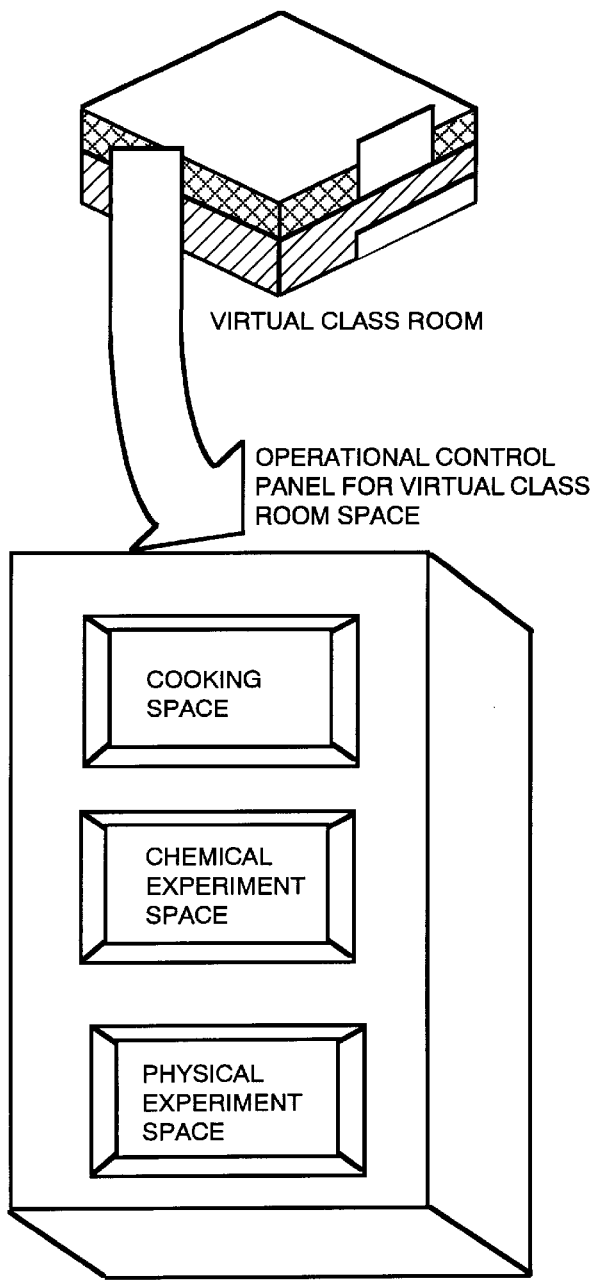

FIG. 30A

PROCESSING DESCRIPTION OF OPERATIONAL CONTROL PANEL FOR VIRTUAL CLASS ROOM SPACE

```
if (pushed an operational button)

then{
    if(space has already been loaded)

then{
    [erase the loaded space]

)

switch (kinds of buttons)    {
        case   "cooking space":
            [load cooking space]
            break;
        case"chemical experiment space":
            [load chamical
            experiment space];
            break;
        case "physical experiment space":
            [load physical experiment
            space];
            break;
    }
return;
```

FIG. 30B

PRIORITY FOR DIVIDED AREA OPERATION

| ATTRIBUTE | ATTRIBUTE VALUE |
|---|---|
| USER IDENTIFIER | 397023 |
| QUALIFICATION | DOMAIN MANAGER |
| CLASS | FIRST CLASS ADVISOR |
| LICENSE FOR "A" GROUP GOODS | 200 |
| LICENSE FOR "B" GROUP GOODS | 100 |
| LICENSE FOR "A" DIVIDED AREA | 100 |
|  |  |

FIG. 36

INFORMATION PROCESSING SYSTEM AND A NETWORK TYPE INFORMATION PROCESSING SYSTEM

BACKGROUND OF THE INVENTION

1. Field of the Invention

The invention relates to an information processing system and a network type information processing system for managing an input data file for every data unit constructing a data file.

2. Description of the prior art

A conventional information processing system includes an input device, storage device, arithmetic processing device, output device and network communication device, and the input device is connected to the storage device which is further connected to the arithmetic device, the output device and the network communication device.

In the conventional network type information processing system, the network communication device of the information processing system described above is connected to network communication device of other information processing systems via a network.

When the virtual three dimensional space is output, for example, indicated in the output device in the information processing system, the data file which is designed and described by the VRML for outputting the virtual three dimensional space is recorded in the storage device of the information processing system.

Further, when the information processing system outputs the virtual three dimensional space which is shared by the output device of each information processing system constructing the network type information processing system, the information processing systems, in which the data file for outputting the virtual three dimensional space to the storage device is not recorded, receives the data file from the information processing system, in which the data file is recorded in the storage device, via the network, and records the data file all together in the storage device.

VRML is the abbreviation of "Virtual Reality Modeling Language" and it means a virtual reality design language for designing and describing the data file. The virtual three dimensional space is output and expressed to the output device of the information processing system based on the data file which is described in the VRML. The output device of each information processing system where the virtual three dimensional space is output is referred to as a "browser".

The virtual three dimensional space to be output to the output device of each information processing system is output based on the data file which is designed and described by VRML. This data file is designed and described using VRML by the combination of such as the descriptions regarding the geometry of the three dimensional object which is output and expressed in the virtual three dimensional space, the descriptions regarding the operation of this three dimensional object, and the descriptions regarding the sound output together with the virtual three dimensional space.

When the conventional information processing system outputs and expresses the virtual three dimensional space to the output portion, a data file of the combination such as described above is recorded in the storage device of the information processing system.

The virtual three dimensional space is output and expressed to the output device of the information processing system based on the data file combined into one and stored in this storage device.

Therefore, after the data file of a certain virtual three dimension space is recorded in the storage device, it is necessary to re-record the combined data file after detecting and partially revising the related portions of the combined data file, even if the partial modification of the combined description is necessary. For example, when a partial change, such as the shape of the object being expressed in the virtual three dimensional space, a partial change of the motion of the object being expressed in the virtual three dimensional space, and a partial change of the sound output when the virtual three dimensional space being output and expressed, is carried out, it is necessary to detect the related porion from the whole data file in which the description regarding the shape in the geometry of these objects, the description regarding the operation of this virtual three dimensional object and the description regarding the sound output when the virtual three dimensional space is output to the output portion, and to add the partial modification to the corresponding files and then to record the changed portions into the combined files. Therefore, it has been a time consuming and difficult thing to add the modification to the virtual three dimensional space.

For example, when only a change is added to only one of the description regarding the geometry of these objects, regarding the operation of the virtual three dimensional object and regarding the sound output to the output portion, all of the descriptions of the combined data files have to be re-recorded in the storage device.

SUMMARY OF THE INVENTION

It is an object of the present invention to provide an information processing system and a network type information processing system for easily carrying out the modification in the descriptions regarding the geometry of these objects, the modification regarding the motion of the virtual three dimensional object, and the modification regarding the sound output.

According to one aspect of the invention, an information processing system includes input means for receiving object data, data registration managing means for extracting a plurality of data units from the object data, and producing linked data which links the plurality of data units to each other, storage device for recording the linked plurality of data units, memory accessing means for accessing the linked plurality of data units stored in the storage device, output device for outputting an object based on the linked plurality of data units recorded in the storage device.

Preferably, the data registration managing means extracts any of the plurality of data units from a shape data unit regarding a shape of objects having different features of images, a material data unit regarding a material of the objects, a partial background data unit regarding a part of the background of the objects, a motion data unit regarding motion of the objects, a processing data unit regarding processing according to the motion of the objects, or a light source data unit regarding a light source for irradiating light on the object.

According to another aspect of the invention, an information processing system includes input means for receiving first and second object data, data registration managing means for extracting a first data unit from the first object data and a second data unit from the second object data, and forming first linked data for linking the first data unit and the second data unit to each other in the first data unit and the second data unit, respectively, storage device for recording the linked first data unit and the second data unit, and an output device for outputting a first object based on the linked first data unit and the second data unit recorded in the storage device.

According to a further aspect of the invention, an information processing system included input means for inputting a first object data and a second object data data registration managing means for extracting a first shape data unit and a first motion data unit from the first object data and extracting a second shape data unit and a second motion data unit from the second object data, forming a first linked data for linking the first shape data unit and the first or second motion data units in the first shape data unit and the first or second motion data unit, recording the first shape data unit, the first or second motion data units and the second shape data unit in a storage device, and outputting the first or second object based on the linked first shape data unit recorded in the storage device, the first or second motion data units and the second shape data unit.

Preferably, the data registration managing means modifies a link of a first shape data unit from the first motion data unit to the second motion data unit according to time, or modifies the link of the first shape data unit from the second motion data unit to the first motion data unit according to time, records the first shape data unit whose link is modified, and the first or second motion data unit linked to the first shape data unit, and outputs the first or second object to an output device, based on the first shape data unit recorded in the storage device by linking the first or second motion data units.

Preferably, the data registration managing means associates a processing data unit for detecting whether first and second objects output to an output device contact to each other with first and the second shape data units regarding first and the second objects.

Preferably, the data registration managing means associates the first partial background data unit, the first shape data unit and the motion data unit extracted from the object data, moves the first object based on the first shape data unit according to the motion data unit, in the first partial background based on the first partial background data unit, and outputs a second partial background based on the second partial background data unit to the output device, by associating the second partial background data unit, which is extracted from the object data for indicating the second partial background based on the moved position, with the first shape data unit, when the first object is moved to a desired position in the first partial background.

According to still further aspect of the invention, a network type information processing system wherein the at least two of the information processing systems are connected to each other via network wherein the first data unit regarding the first object recorded in a storage device of a first of the at least two information processing systems is recorded in a storage device of a second of the at least two information processing systems, the first object is displayed by an output device of the second of the at least two information processing systems based on the first data unit recorded in the storage device of the second of the at least two information processing systems.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 2A–2D show attributive information regarding each object;

FIG. 4A shows managing information in the transmitting/receiving terminal information managing device;

FIG. 4B shows managing information in the attribute data registration managing device;

FIG. 6A shows a synchronous system among a plurality of the information processing systems;

FIG. 6B shows a virtual three dimensional space at terminal A;

FIG. 6C shows a virtual three dimensional space at terminal B;

FIGS. 7A and 7B show managing information in the object information modification managing device;

FIG. 10A shows an attributive information including communication timing information;

FIGS. 10B–10E show attributive information;

FIG. 26 is a conceptual table regarding a time scheduling management for setting various data units;

FIG. 30A shows a system including a plurality of virtual spaces;

FIG. 30B shows an example of description of object data;

FIG. 36 shows an attributive information including information regarding various control for dividing areas.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Embodiment 1.

Figure 1A:
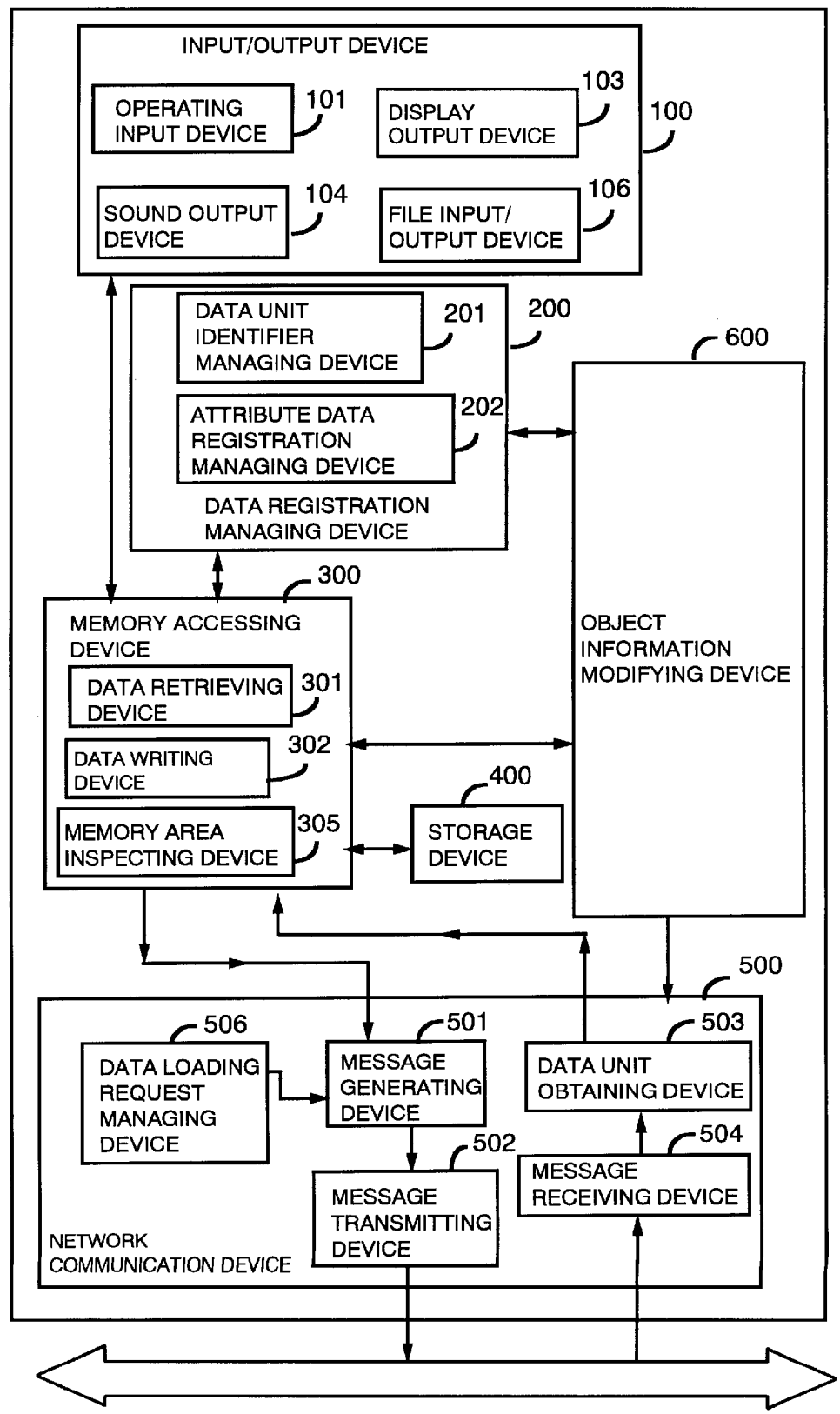
FIG. 1A shows an information processing system of the present invention.

An information processing system or a network type information processing system of a first embodiment of the present invention is described below using FIG. 1. FIG. 1A shows an information processing system or a network type information processing system of an embodiment of the present invention. In FIG. 1, an input/output device 100 has an input portion and an output portion. Object data for indicating an object to the output portion is input to the input portion.

Memory accessing device 300 is connected to the input/output device. Based on words which are identifiers or terms of the description languages, the memory accessing device 300 divides the object data input to the input portion into data units which are a plurality of data units for every element being a property of the image or picture to be output to the output portion. The data units are output to the storage device 400 as instructions such as writing, reading and deleting. A data registration managing device 200 is connected to the memory accessing device 300.

Storage device 400 or a memory portion is connected to the memory accessing device 300 and records each data unit. A plurality of data units do not need to store all data units in a single storage device 400, but they may be divided and recorded for every data unit into the storage device 400 in the different information processing system via the network.

Network communication device 500 is connected to the memory accessing device 300 and the network. An object information modifying device 600 is connected to the memory accessing device 300, the data registration managing device 200 and the network communication device 500.

An operating input device 101 is provided in the input/output device 100. A display output device 103 is provided in the input/output device 100 and indicate the virtual three dimensional space. A sound output device 104 is provided in the input/output device 100 and reproduce sound.

A data unit identifier managing device 201 is provided in the data registration managing device 200. The data unit identifier managing device 201 manages plural kinds of data units regarding the objects of the virtual three dimensional space by dividing them into an arbitrary size, and also manages each data unit by supplying to each data unit the identifier or the relative data indicating which divided area they be belong and the identifier of the terminal having each data unit at a start of the virtual three dimensional space. Further, the data unit for outputting each divided area to the output portion may be a partial background data unit.

An attribute data registration managing device 202 is provided in the data registration managing device 200. The attribute data registration managing device 202 properly sets, manages and modifies each data unit such as the three dimensional model data unit for indicating the object indicated in the virtual three dimensional space, the sound source data unit indicating the sound source, the text data unit indicating the text and the image data unit indicating the image, for every attribute of an element having various characters.

The data files or the object data indicated in the virtual three dimensional space are divided into each data unit such as the three dimensional model data unit or the shape data unit, the sound source data unit, the text data unit and the image data unit based on the language by which each data file is described. Further, each data unit is provided with an attribute value based on the characteristic attribute possessed by each data unit and the eigen value of each data unit, and each data unit is registered and managed by the attribute data registration managing device 202.

The pointer of other data units linked to a data unit or the file path name are managed as the attributes by the attribute data registration managing device 202. As for the data unit regarding the object expressed in the virtual three dimensional space, there is motion object data regarding the operation of the three dimensional object.

Further, as for the data unit regarding the object expressed in the virtual three dimensional space, there is a light source data unit regarding the light source for indicating and illuminating the three dimensional object on the monitor.

The object indicated in the virtual three dimensional space is managed by the attribute data registration managing device 202 as the data unit in which each data unit having various attributes is independent of each other. Extension of the link among each data unit is not limited.

A data retrieving device 301 is provided in the memory accessing device 300 and retrieves the corresponding data unit based on the attribute information possessed by each data unit.

A memory area inspecting device 305 is provided in the memory accessing device 300 and inspects the vacant memory divided area on the terminal or an information processing system necessary for loading the data unit. Further, the memory area inspecting device 305 erases the data unit decided to be unnecessary based on the result of the inspection.

A message generating device 501, message transmitting device 502, data unit obtaining device 503 and message receiving device 504 communicate with a plurality of the information processing systems via the network.

A data loading request managing device 506 manages the data units possessed by other information processing systems connected via the network, requests and loads the data units possessed by other information processing system if necessary.

The message generating device 501, the data unit obtaining device 503, the message receiving device 504 and the data loading request managing device 506 are provided in the network communication device 500.

The system including the input/output device 100, the data registration managing device 200, the memory accessing device 300, the storage device 400, the network communication device 500 and the object information modifying device 600 are referred to as an information processing system. The system connected with a plurality of the information processing systems via the network is referred to as a network type information processing system.

Figure 1B:
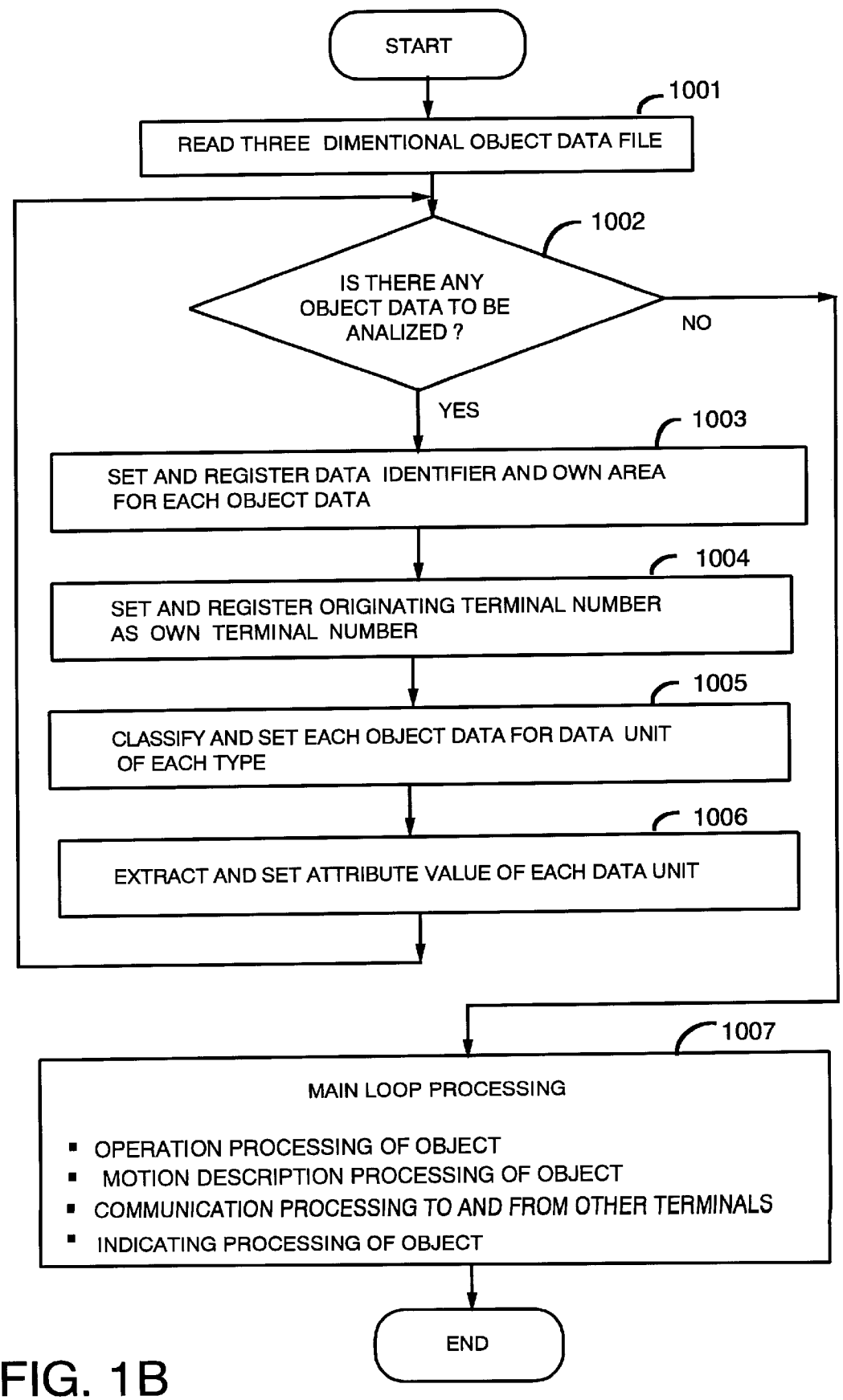
FIG. 1B is a flowchart showing a basic processing sequence of FIG. 1A.

FIG. 1B is a flowchart showing a basic processing sequence of FIG. 1A. In FIG, 1B, the file input/output device 106 reads out three dimensional object data in step 1001. In step 1002, the data unit identifier managing device 201 examines whether there is any object data to be analyzed. If there is any object data to be analyzed, in step 1003, the data unit identifier managing device 201 sets data identifier and the memory accessing device 300 registers object data and an own area into the storage device 400. In step 1004, the attribute data registration managing device 202 sets the originating terminal number as own terminal number and the memory accessing device 300 registers terminal number into the own area of the storage device 400. In step 1005, the attribute data registration managing device 202 classifies and sets each object data for data unit of each type. In step 1006, the attribute data registration managing device 202 extracts and sets attribute value of each data unit. In step 1007, predefined sequences such as operation processing of object, motion description processing of object and indication processing of object in the main loop are carried out. In step 1002, if there is no object data to be analyzed, the processing goes to step 1007.

The data unit retrieving device 301 can retrieve the data units based on the attribute value shown by the data units FIGS. 2A–2D. The attribute information of the data units regarding the object in the virtual three dimensional space recorded in the storage device 400 is described using FIG. 2A–FIG. 2D. Each of the data units in FIG. 2A–FIG. 2D includes attributes such as data identifier and attribute values.

For example, in FIG. 2A, a data identifier as the attribute has 3479890 as an attribute value. In the same way, data type is 3 dimensional model data, x coordinate position is 100.0, . . . , the shape type is cylinder. In FIG. 2B, the data identifier is 783002, data type is sound source data, x coordinate position is 100.0, . . . , sound source type attribute is environmental sound. In FIG. 2C, the data type is text data, linked destination is 347890, . . . , text data file name is C:¥DOC¥TEXT 01.txt. In FIG. 2D, the data type is text mapping image, . . . , image data file name is C:¥IMAGE¥txpat.gif.

In this way, a plurality of data which has been conventionally incorporated in one data file are managed as a combination via a pointer as respective independent data units, so that the data files regarding the object indicated in the virtual three dimensional space can easily be partially modified.

Further, other data units linked with a data unit can be retrieved from any data unit such as the three dimensional model data unit, the sound source data unit, the text data unit and the image data unit.

Embodiment 2.

Figure 3A:
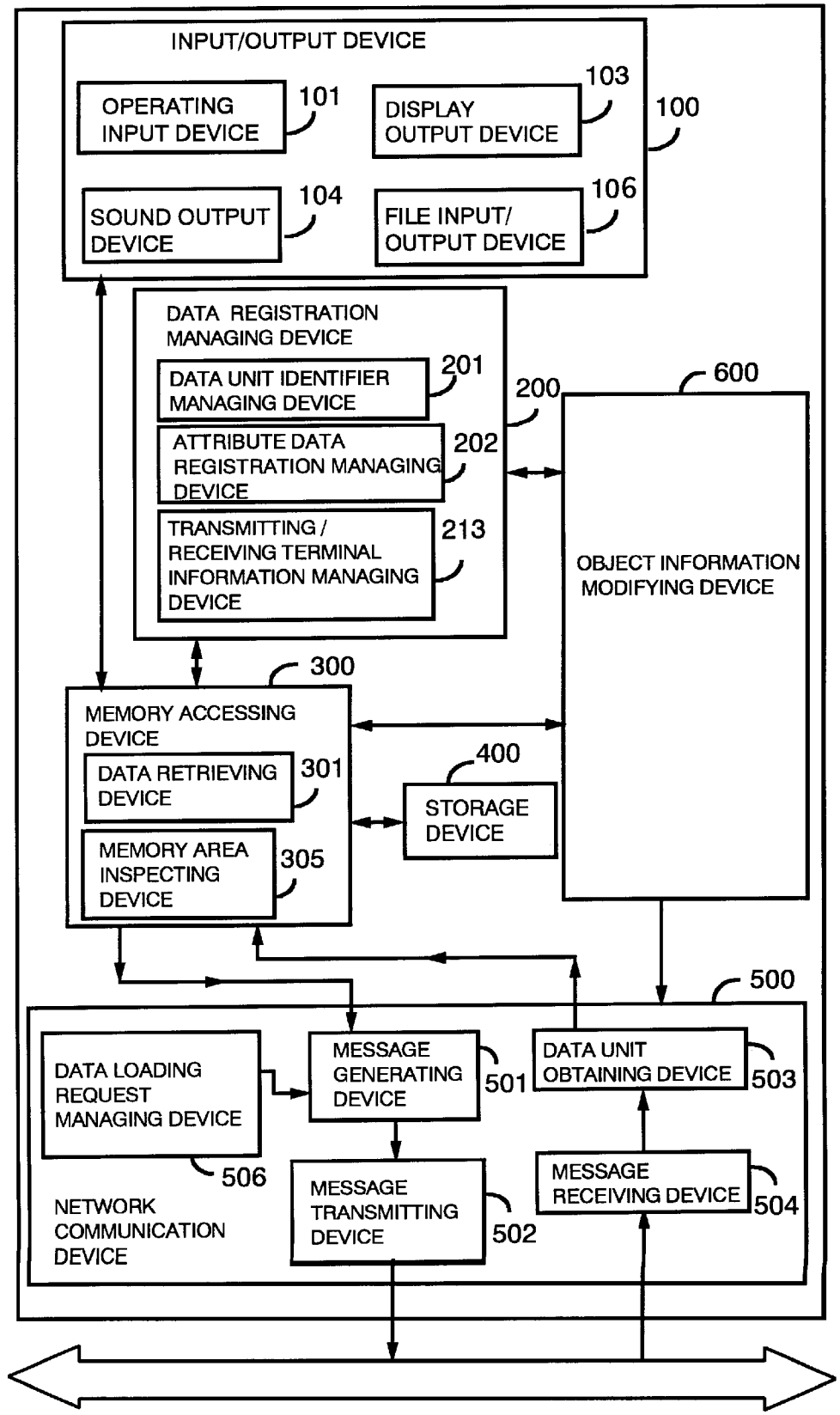
FIG. 3A shows another information processing system of the present invention.

A second embodiment of the present invention is described below using FIG. 3. FIG. 3A shows an information processing system or a network type information processing system according to a second embodiment. In FIG. 3A, a transmitting/receiving terminal information managing device 213 is provided in the data registration managing device 200 and each user in a plurality of the information processing systems sets communication processing types of the terminal via the network for every object or for every object in the divided area.

In the second embodiment in FIG. 3A, since the same or corresponding portions in the first embodiment in FIG. 1A have the same numbers, their detailed description are omitted and the differences between FIG. 3A and FIG. 1A are only described.

The system which shares the data units regarding the object of the virtual three dimensional space assumed in the present embodiment by a plurality of the information processing systems via the network is not limited to a client server system and a complete distribution system. However, the system can be modified to any type of system and select a client server system and a complete distribution system for every data unit.

Figure 3B:
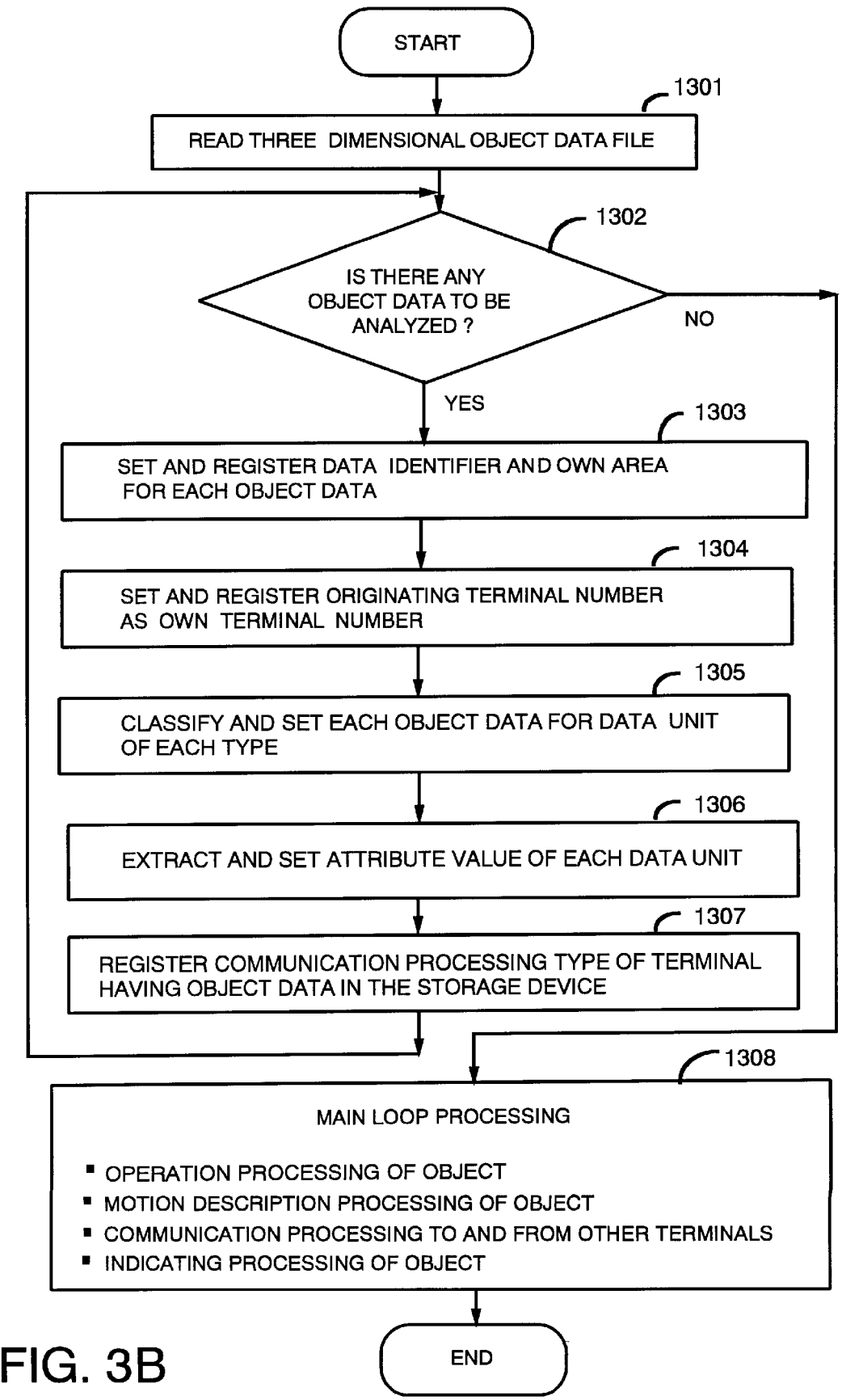
FIG. 3B is a flowchart showing a basic processing sequence of FIG. 3A.

FIG. 3B is a flowchart showing a basic processing sequence of FIG. 3A. In FIG. 3B, the file input/output device 106 reads out three dimensional object data on step 1301. In step 1302, the data unit identifier managing device 201 examines whether there is any object data to be analyzed. If there is any object data to be analyzed, in step 1303, the data unit identifier managing device 201 sets data identifier and the memory accessing device 300 including the memory area inspecting device 305 registers object data and an own area into the storage device 400. In step 1304, the attribute data registration managing device 202 sets the originating terminal number as own terminal number and the memory accessing device 300 registers terminal number into the own area of the storage device 400. In step 1305, the attribute data registration managing device 202 classifies and sets each object data for data unit of each type. In step 1306, the attribute data registration managing device 202 extracts and sets attribute value of each data unit. In step 1307, the transmitting/receiving terminal information managing device 213 registers communication processing type of terminal having object data into the storage device 400. In step 1308, predefined sequences such as operation processing of object, motion description processing of object and indication processing of object in the main loop are carried out. In step 1302, if there is no object data to be analyzed, the processing goes to step 1308.

Figure 3C:
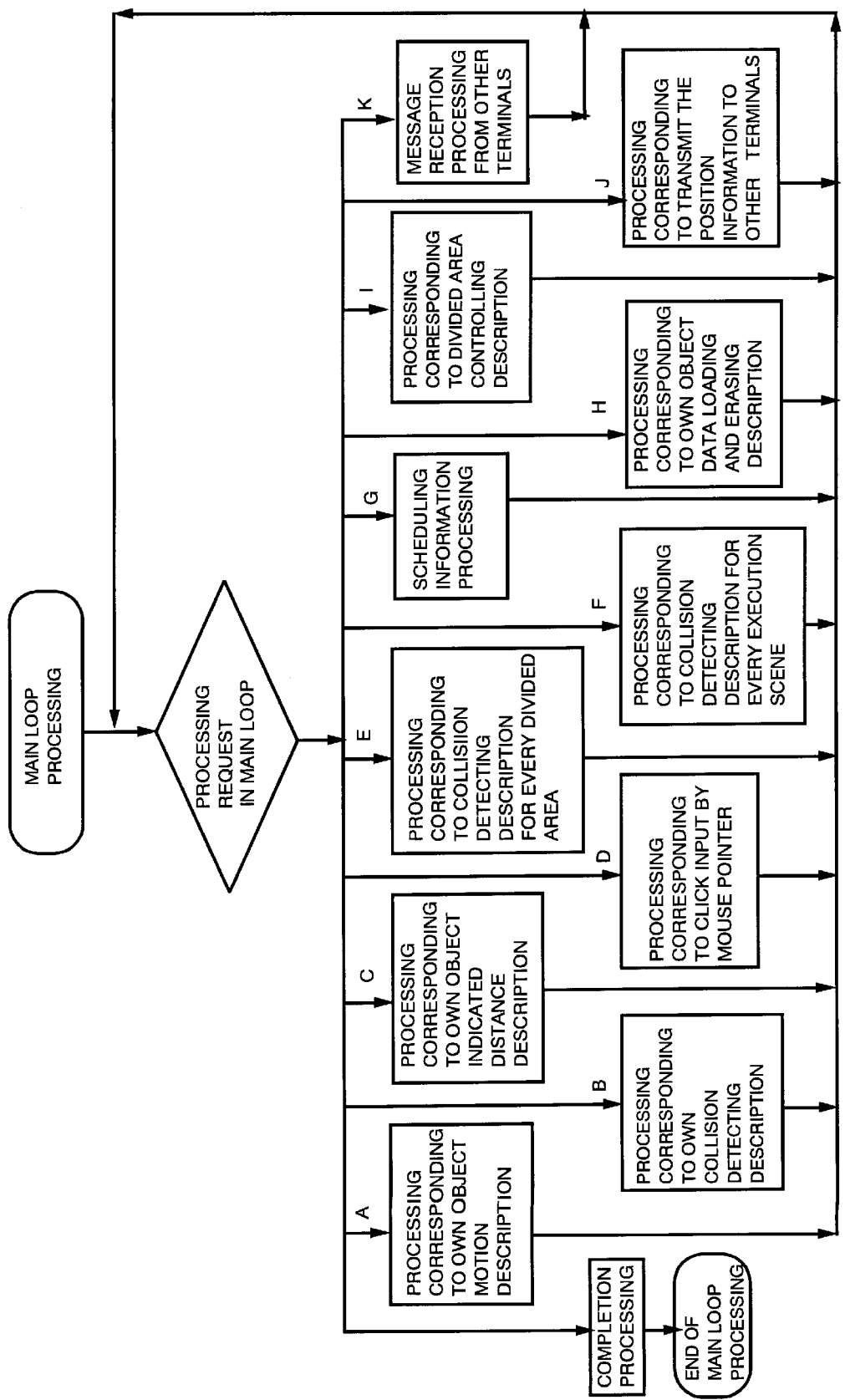
FIG. 3C is a flowchart showing a detailed processing sequence in FIG. 3B.

FIG. 3C shows a detailed processing in the main loop processing step 1308 of FIG. 3B. In FIG. 3C, when a processing request occurred in the main loop, each task A to K is selected according to the request. The tasks are, for example, step A corresponding to own object motion description, step B corresponding to own collision detecting description, step C corresponding to indicated distance detection description, step D corresponding to the click input by the mouse-pointer, step E corresponding to collision detecting description data for every divided area, step F corresponding to collision detecting description for every execution scene, step G corresponding to scheduling information processing, step H corresponding to own object data loading and erasing description, step I corresponding to the divided area controlling description, step J corresponding to transmit the position information to other terminals, step K corresponding to message reception processing from other terminals.

The information management table is described using FIG. 4A and FIG. 4B. FIG. 4A shows relationship between the object data identifier and the communication type of the terminal in the transmitting/receiving terminal information managing device 213. For example, the object data identifiers A, B and D correspond to the client server type of terminal, and the object data identifiers C, D and F correspond to the complete distribution types of terminal.

FIG. 4B shows relationship between the object data identifier and the terminal identifier with data in the attribute data registration managing device 202. For example, the object data identifiers A and F correspond to "1" of the terminal identifier with data, and the object data identifiers B, C and D correspond to "3" of the terminal identifier with data, and the object data identifier E corresponds to "4" of the terminal identifier with data.

Each terminal has an eigen value. When each terminal is synchronized with a data unit regarding the object in the virtual three dimensional space, and the terminals carry out the communication processing based on the attribute data registration managing device 202 for managing the information regarding the eigen value of the terminals having the data unit regarding the object and the transmitting/receiving terminal information managing device 213.

In the terminals of the present second embodiment, any one of the client server type communication systems or the complete distribution type communication system is set for every data unit regarding each object as shown in FIG. 4A. Further, the communication system may be set according to the data unit for every predetermined divided area.

In this way, the information processing system can divide a plurality of data units regarding the object output to the virtual three dimensional space to a plurality of the information processing systems via the network, and also can output the object having a large amount of data to the virtual three dimensional space.

Embodiment 3.

Figure 5A:
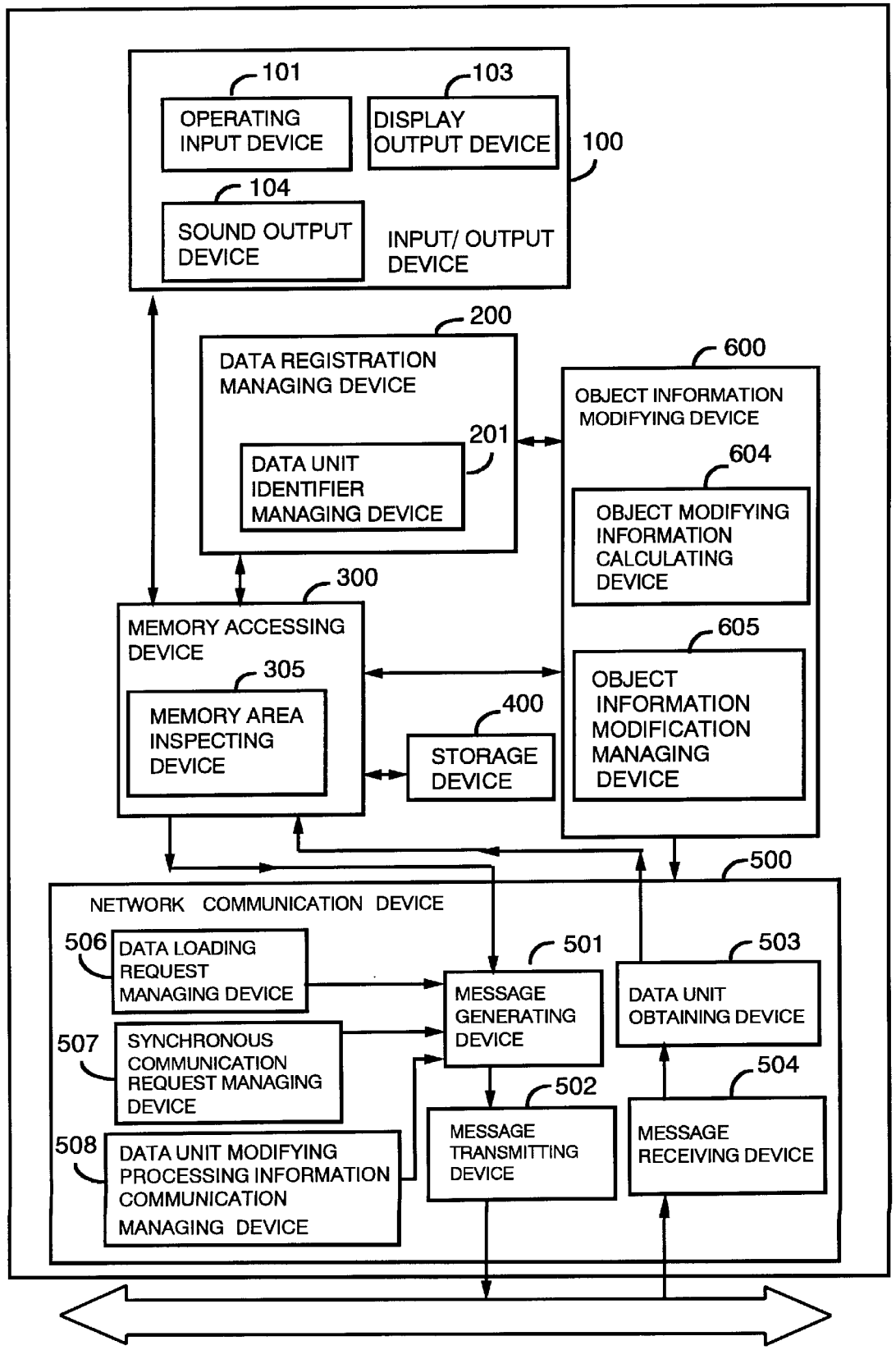
FIG. 5A shows another information processing system of the present invention.

Another embodiment of the present invention is described below using FIG. 5A. FIG. 5A shows an information processing system or the network type information processing system according to a third embodiment. In FIG. 5A, a synchronous communication request managing device 507 is provided in the network communication device 500 and generates the communication message for synchronizing the sharing of the virtual three dimensional space with other terminals.

Further, a data unit modifying processing information communication managing device 508 is provided in the network communication device 500. An object modifying information calculating device 604 is provided in the object information modifying device 600, and renews the data unit regarding the object in the virtual three dimensional space indicated between each terminal.

An object information modification managing device 605 is provided in the object information modifying device 600, and manages the communication system as the renewal system of the data unit regarding the object in the virtual three dimensional space indicated between each terminal.

Further, in the third embodiment in FIG. 5A, since the same or corresponding portions in the first embodiment in FIG. 3A have the same numbers, their detailed description are omitted and the differences between FIG. 5A and FIG. 3A are only described.

Figure 5B:
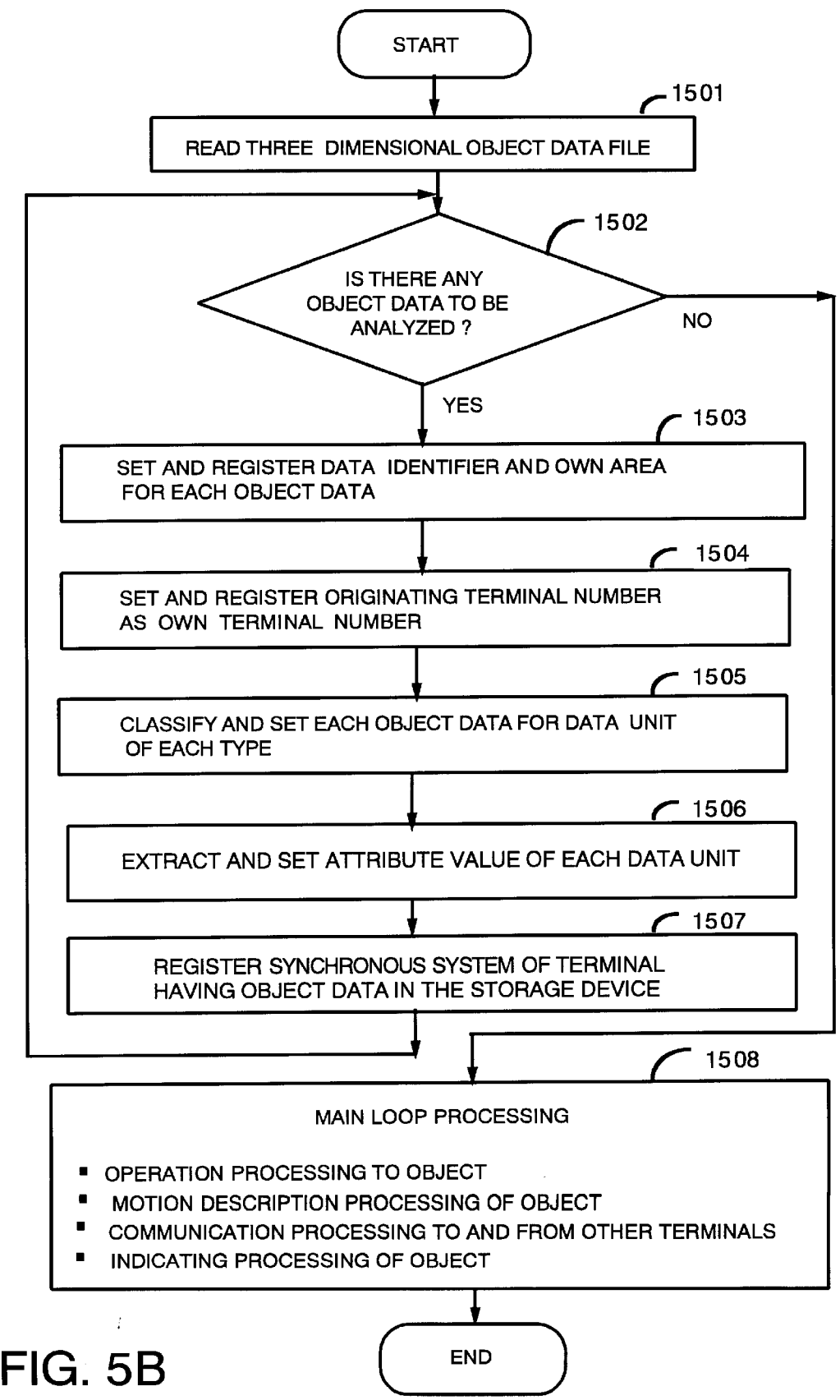
FIG. 5B is a flowchart showing a basic processing sequence of FIG. 5A.

FIG. 5B is a flowchart showing a basic processing sequence of FIG. 5A. In FIG. 5B, the file input/output device 106 reads out three dimensional object data on step 1501. In step 1502, the data unit identifier managing device 201 examines whether there is any object data to be analyzed. If there is any object data to be analyzed, in step 1503, the data unit identifier managing device 201 sets data identifier and the memory accessing device 300 including the memory area inspecting device 305 registers object data and an own area into the storage device 400. In step 1504, the attribute data registration managing device 202 sets the originating terminal number as own terminal number and the memory accessing device 300 registers terminal number into the own area of the storage device 400. In step 1505, the attribute data registration managing device 202 classifies and sets each object data for data unit of each type. In step 1506, the attribute data registration managing device 202 extracts and sets attribute value of each data unit. In step 1507, the object information modification managing device 605 in the object information modifying device 600 registers synchronous system of terminal having object data into the storage device 400. In step 1508, predefined sequences such as operation processing of object, motion description processing of object and indication processing of object in the main loop are carried out. In step 1502, if there is no object data to be analyzed, the processing goes to step 1508.

Figure 5C:
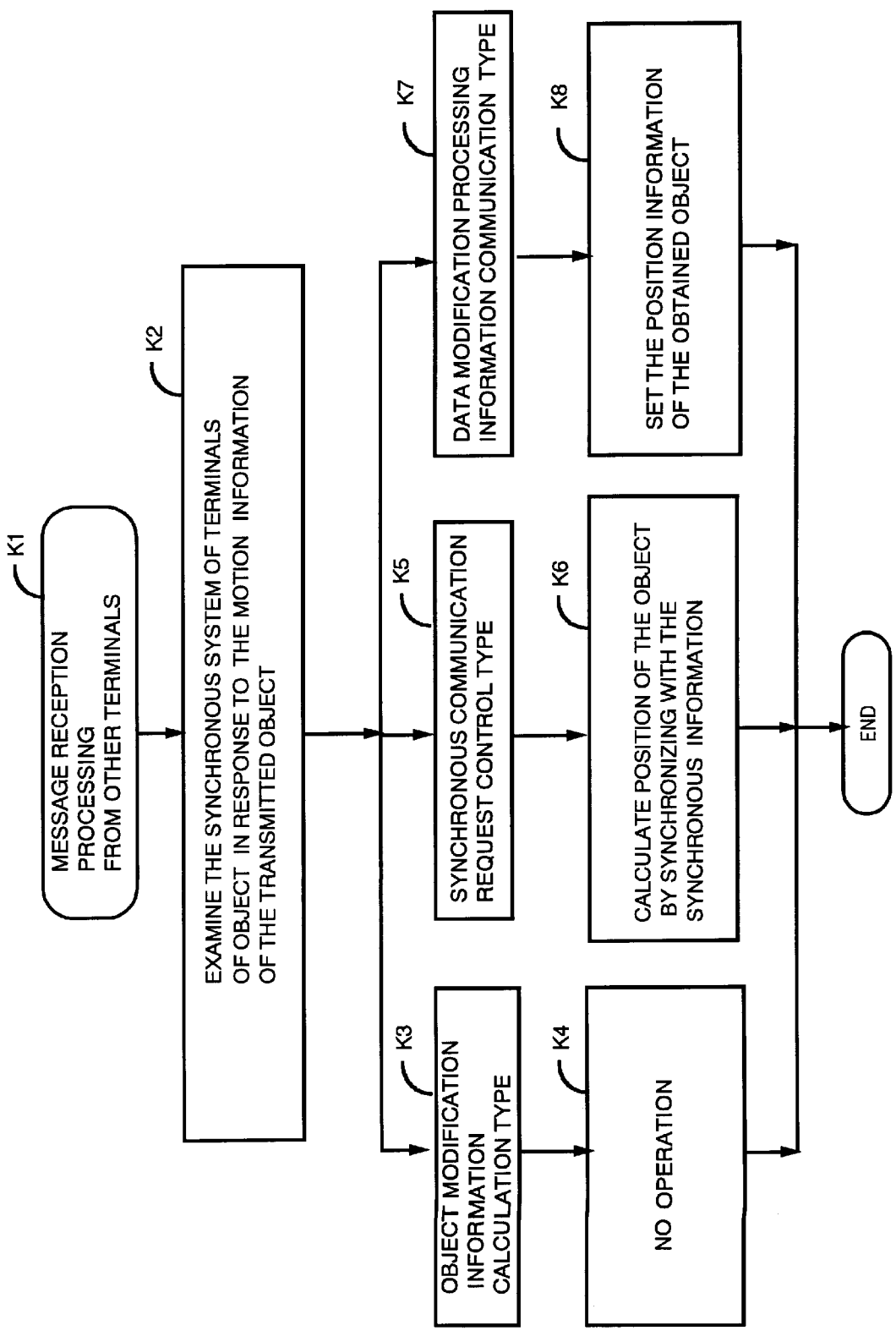
FIG. 5C is a flowchart showing one of the processings in FIG. 5B.

FIG. 5C is a flowchart showing a message reception processing from other terminals in one of the communication processing in the main loop processing step 1508 in FIG. 5. In FIG. 5C, the object information modification managing device 605 examines synchronous systems of the terminal of object in response to the motion information of the transmitted object. If the motion information is object modification information calculation type as shown in step K3, the object information modification managing device 605 does no operation in step K4. Because, the position of the object is calculated periodically in the inner timer interruption processing. If the motion information is a synchronous communication request control type as shown in step K5, the object information modification managing device 605 calculates positions of the object by synchronizing with the synchronous information. If the motion information is a data modification processing information communication type as shown in step K7, the object information modification managing device 605 sets the position of the obtained object in step K8.

The synchronizing system which can be selected by a plurality of users of the virtual three dimensional space in the object information modification managing device 605 in FIG. 5A is described using FIG. 6A, FIG. 6B and FIG. 6C.

It is necessary to synchronize a plurality of terminals for simultaneous joint work by sharing the virtual three dimensional space between the plurality of terminals, so that each information regarding the virtual three dimensional space is matched for every terminal.

For example, there are three methods for synchronizing a plurality of terminals as described below.

1. The modifying processing of the virtual three dimensional space is carried out in each terminal.

For example, the server or the specific terminal gives only timing of starting the motion of the spherical object, and the calculation processing for modifying of the coordinate during the uniform linear motion is carried out in each terminal. The time is managed for every terminal.

2. Only the synchronous communication necessary for modifying the information in the virtual three dimensional space is carried out.

For example, the coordinate calculation processing using the motion function of the spherical object is carried out in each terminal, while time is managed by all terminals. The timing information from the server or the specific terminal is transmitted periodically to indicate the same virtual three dimensional space.

3. The modifying processing of the virtual three dimensional space is carried out in the specific terminal and the modified information is communicated to other terminals.

For example, the coordinate calculation processing using the motion function of the spherical object is carried out only in the specific terminal, while the coordinate data as the calculation result is transmitted to other terminals and simultaneously the same virtual three dimensional space is indicated. The modified information does not need to be transmitted periodically.

The efficiency of the above three methods changes the balance between the performance of the calculation processing in each calculator and the performance of network communication. When the cost of the network communication is higher, the processing efficient of the above item 1 is better. When the calculation processing cost in terminals is higher, the processing efficient of the above item 3 is better.

The method for synchronizing a plurality of terminals via the network can be modified for every data unit in each divided area. The method for synchronizing a plurality of terminals via the network may be modified for every assigned divided area or for every other data unit.

The object information modification managing device 605 shown in FIG. 5A is described below using FIG. 7A and FIG. 7B.

FIG. 7A shows relationship between the object data identifier and the communication type of the terminal in the transmitting/receiving terminal information managing device 213. The contents of FIG. 7A are the same as that of the FIG. 4A, and the detailed description thereof is omitted.

FIG. 7B shows relationship between the object data identifier and the synchronizing system of the terminal in the object information modification managing device 605. For example, the object data identifiers A and C correspond to "object information modifying calculation", and the object data identifiers B and E correspond to "synchronizing communication request management", and the object data identifiers D and F correspond to "data modification processing information communication".

Each terminal has an eigen value. When each terminal is synchronized with the data unit regarding the object, the terminals carry out the communication processing based on the attribute data registration managing device 202 for managing the information regarding the eigen value of the terminals having the data unit regarding the object and the object information modification managing device 605. The communication system may be set for the data unit for every desired divided area.

In this way, the method for synchronizing the plurality of terminals due to the update of the data unit can be modified in response to the calculation load in each terminal and the communication load on the network.

Embodiment 4.

Figure 8:
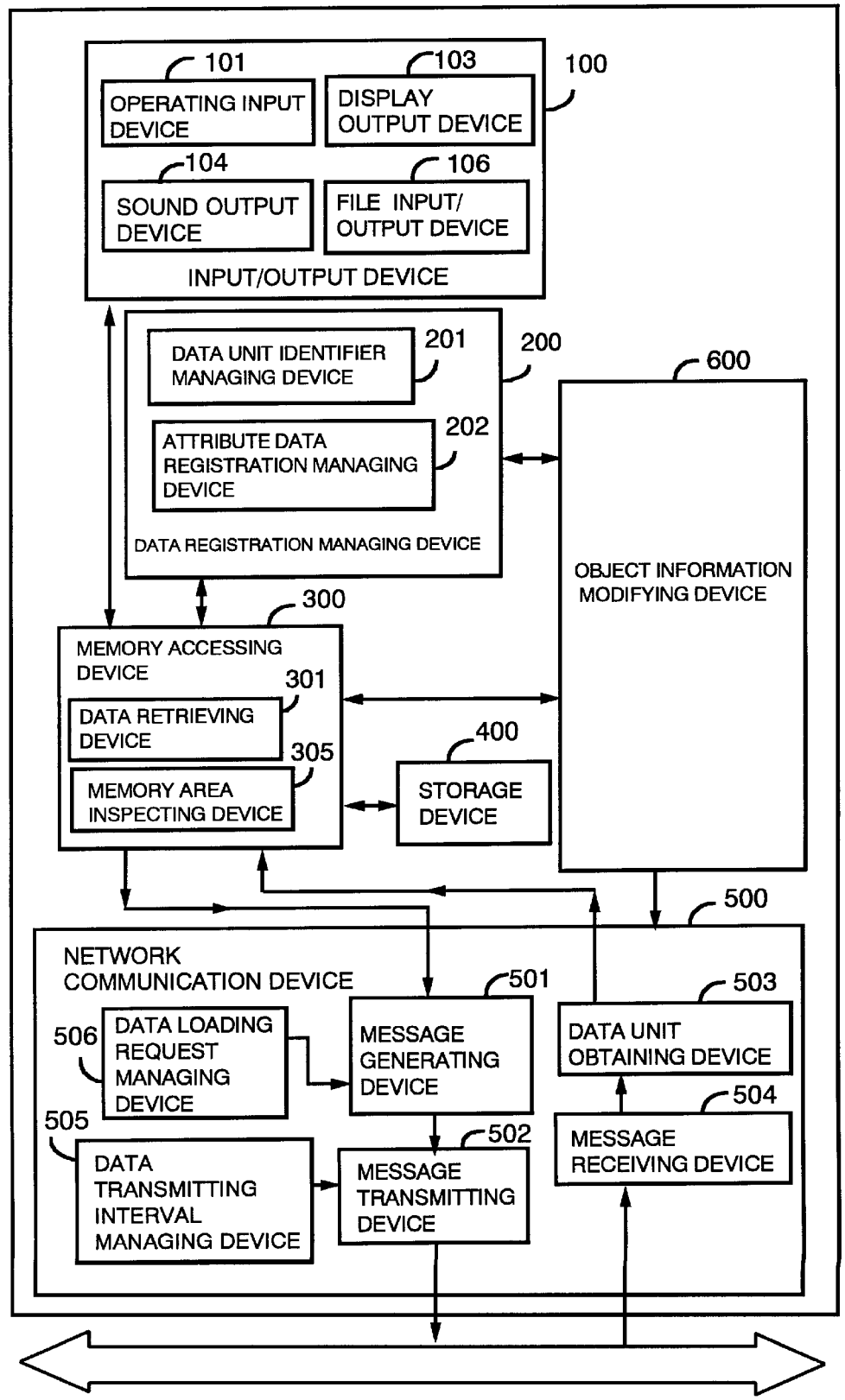
FIG. 8 shows another information processing system of the present invention.

A still further embodiment of the present invention is described below using FIG. 8. FIG. 8 shows an information processing system or a network type information processing system according to a fourth embodiment.

In FIG. 8, a data transmitting interval managing device 505 is provided in the network communication device 500. Further, each data unit has a level according to the real time response indicating the length of the synchronous timing as an attributes. According to this level of the real time response characteristic, the data transmitting interval managing device 505 adjusts and modifies the transmitting interval of the updated data unit.

In the fourth embodiment in FIG. 8, since the same or corresponding portions in the first embodiment in FIG. 1A have the same numbers, their detailed description are omitted and the differences between FIG. 8 and FIG. 1A are only described.

Figure 9:
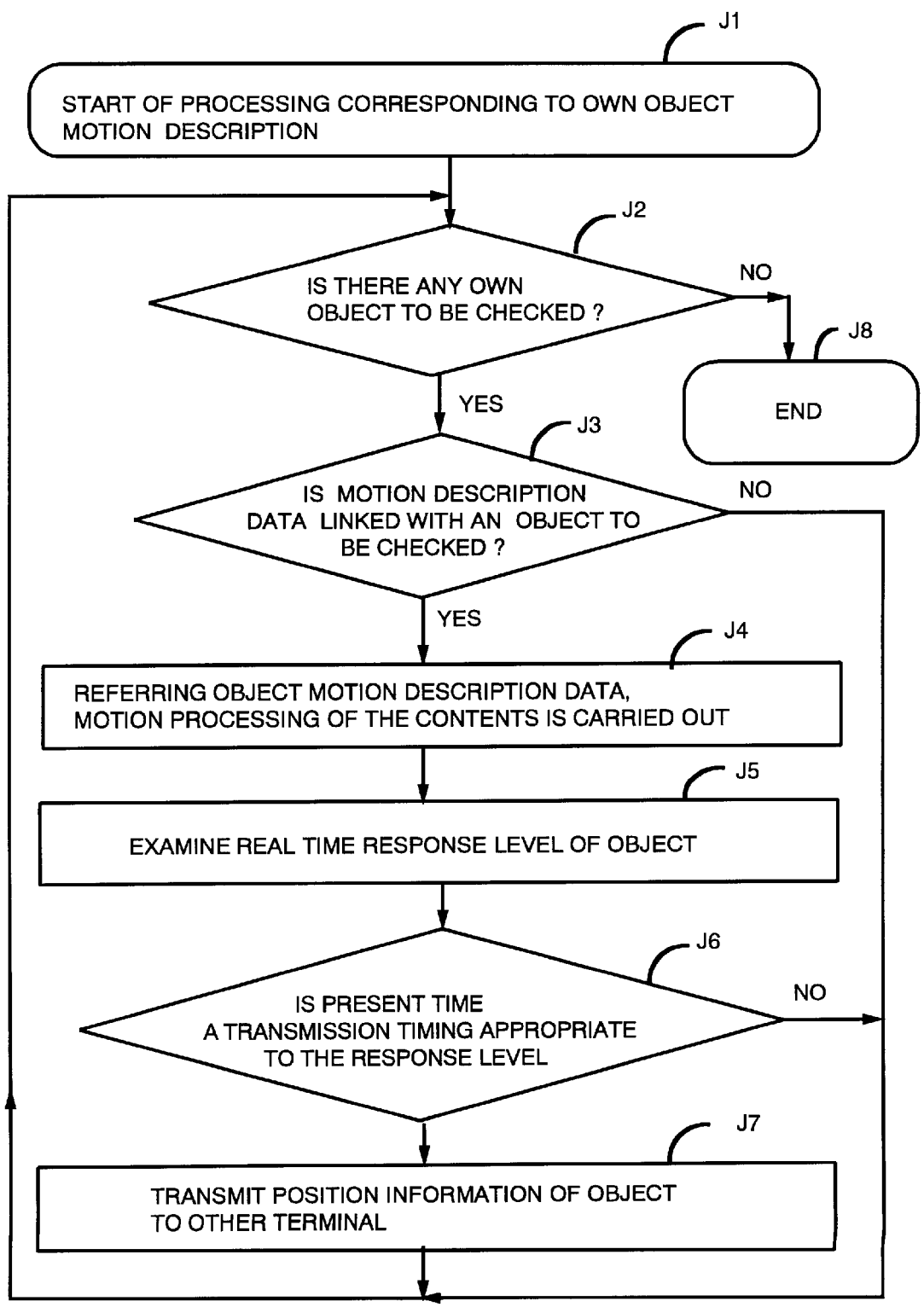
FIG. 9 is a flowchart showing a basic processing of FIG. 8.

FIG. 9 is a flowchart showing a processing sequence of FIG. 8. The flowchart of the processing corresponding to the description regarding the operation of the own object is described in reference to the motion data unit.

In the first step J1, the information processing system starts the processing corresponding to the motion description of the own object. After step J1, the processing goes to step J2.

In step J2, the data unit identifier managing device 201 confirms whether the object to be checked exists or not. If there is an object to be checked, the processing goes to step J3. If there is no object to be checked, the processing goes to step J2.

In step J3, the data unit referring device 602 in the object information modifying device 600 confirms whether the object to be checked is linked with the motion data unit or not. If the object to be checked is linked with the motion data unit, the processing goes to step J4. If the object to be checked is not linked with the motion data unit, the processing goes to step J2.

In step J4, the object modifying information calculating device 604 refers the object motion data unit and carries out the motion processing corresponding to the contents of the object motion data unit. After completion of step J4, the processing goes to step J5.

In step J5, the data retrieving device 301 examines real time response level of the object.

In step J6, the data transmitting interval managing device 505 examines whether the present time is a transmission timing appropriate to the response level. If the present time is an appropriate transmission timing, the processing goes to step J7. If the present time is not an appropriate transmission timing, the processing goes to step J2.

In step J7, the message generating device 501 transmits the position information of the object to the other terminals.

The management for setting the transmission timing of the communication messages used for synchronizing a plurality of terminals in the data transmitting interval managing device 500 illustrated in FIG. 8 is described using FIG. 10A~FIG. 10E.

In order to reduce the communication processing cost, in the communication among each terminal for matching each of the virtual three dimensional space, the communication processing is carried out for every level such as a higher level requiring the real time response and a lower level requiring no such real time response.

In FIG. 10A, A~D are examples of the objects in the virtual three dimensional space. A shows a human being, B shows a condor, C shows a cloud, and D shows a sun. The transmission timing interval for the coordinate modifying information is set as the attribute level of the real time response. For example, the real time response level of the human being is 50 as shown in FIG. 10B, the real time response level of the condor is 100 as shown in FIG. 10C, the real time response level of the cloud is 500 as shown in FIG. 10D, and the real time response level of the sun is 2000 as shown in FIG. 10E.

In this way, since the transmitting interval can be modified in response to the level of the real time response of the data unit in each terminal, the transmitting time interval of the data unit having a lower level of the real time response is decreased to reduce the load of the network.

Embodiment 5.

Figure 11:
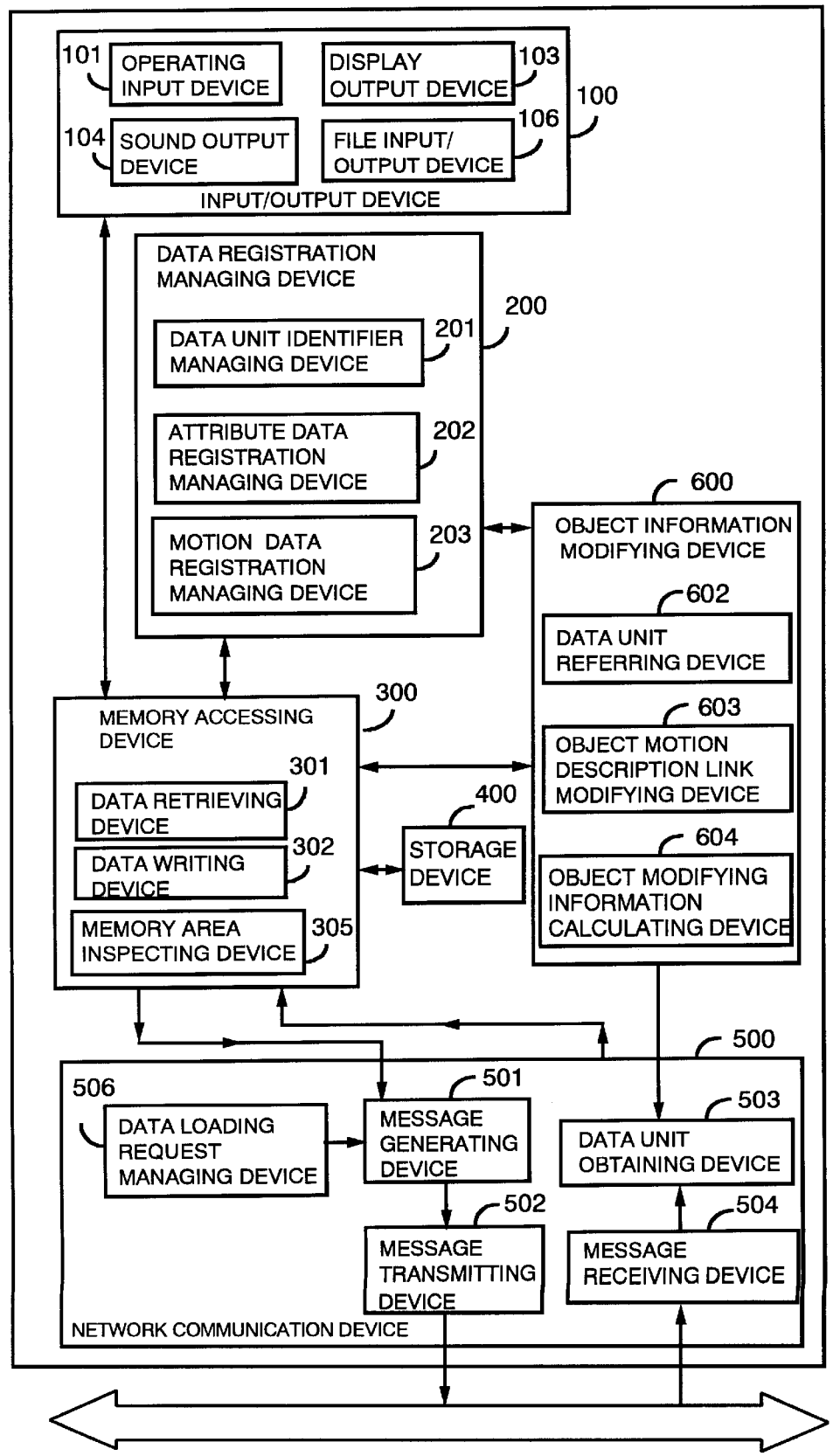
FIG. 11 shows another information processing system of the present invention.

A further embodiment of the present invention is described below using FIG. 11. FIG. 11 shows an information processing system or the network type information processing system according to a fifth embodiment.

In FIG. 11, a motion data registration managing device 203 is provided in the data registration managing device 200. The three dimensional model data unit of the object in the virtual three dimensional space can be divided into the data units regarding the coordinates, shape, color, material and motion. These data units regarding the coordinates, shape, color, material and motion are independent of each other, and equally handled and managed. The data unit regarding the color is referred to a color data unit, the data unit regarding the motion is referred to a motion data unit, the data unit regarding the processing operation with the motion of the object is referred to a processing data unit, and the data unit regarding the material to describe the object such as metal or plastic is referred to a material data unit.

The motion data unit which is the motion object data of the object is managed by the motion data registration managing device 203. For example, a plurality of motion data units are linked to one coordinate data unit by the motion data registration managing device 203.

A data unit referring device 602 is provided in the object information modifying device 600. For example, the motion data units can be referred by examining the object in the link between the coordinate data unit and the motion data unit.

An object motion description link modifying device 603 is provided in the object information modifying device 600 and the motion of the object can be modified by adding, modifying and deleting the link. An object modifying information calculating device 604 is provided in the object information modifying device 600, and carry out the processing of the motion of the object based on the referred motion object data.

In the fifth embodiment in FIG. 11, since the same or corresponding portions in the first embodiment in FIG. 1A have the same numbers, their detailed description are omitted and the differences between FIG. 11 and FIG. 1A are only described.

The object in the virtual three dimensional space to be output to the display output device 103 is motion-processed based on the motion data unit which is programmed in advance.

The motion data units are periodically processed by timer interruption. The processing regarding the motion data units is carried out according to the shape and the location of the object at the time of interruption. The interruption processing by the timer is one of the processings which are branched by the processing request in the main loop as shown in the flowchart of FIG. 3C.

Figure 12:
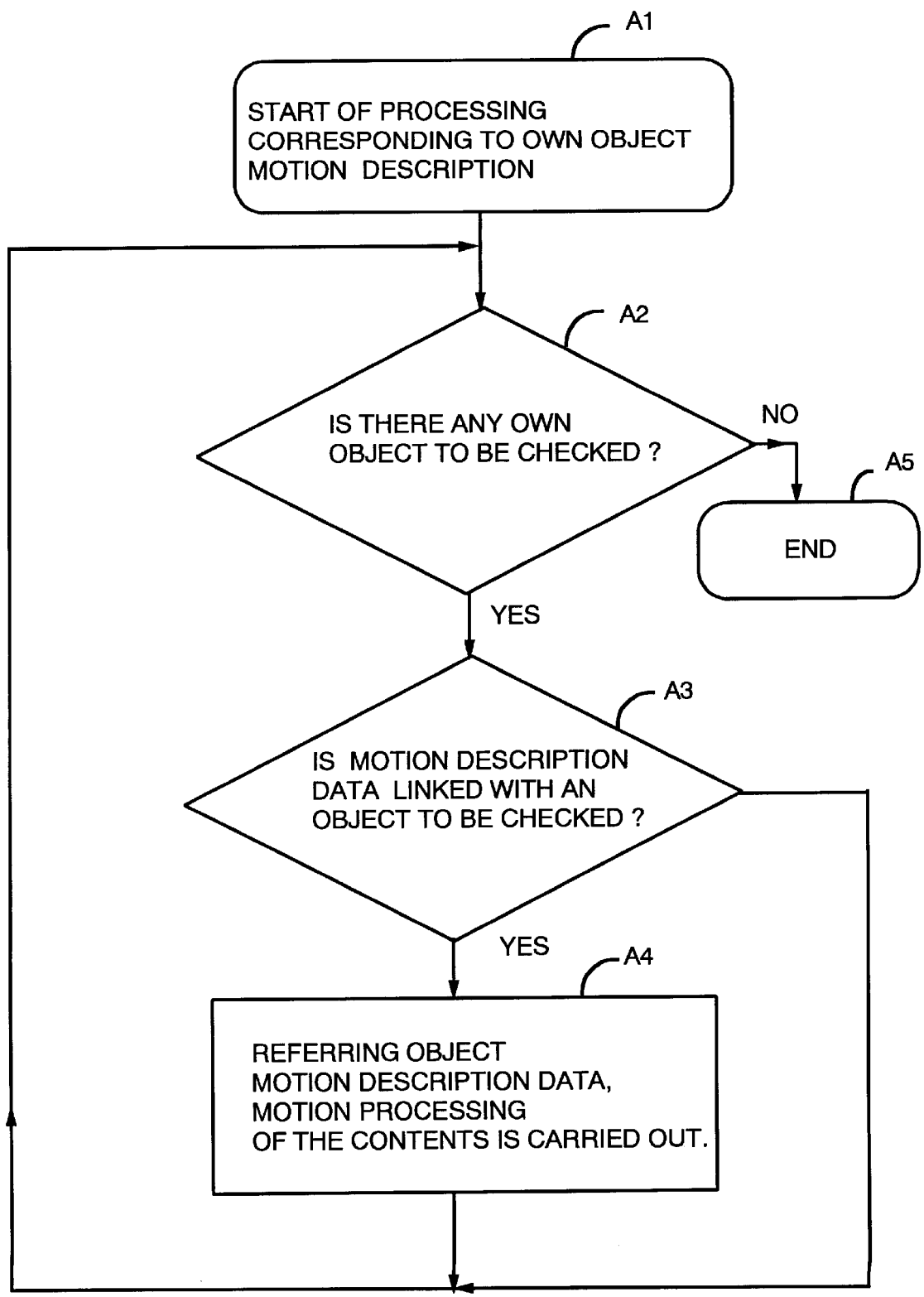
FIG. 12 is a flowchart showing a processing sequence of an motion data unit.

The processing of the object motion data unit is described using the flowchart of FIG. 12. The motion data unit is handled to be equal to the data units such as coordinate, shape, color and material of the object, and is managed by the motion data registration managing device 203.

The flowchart of the processing corresponding to the description regarding the operation of the own object is described in reference to the motion data unit.

In the first step A1, the information processing system begins the processing corresponding to the motion description of the own object. After step A1, the processing goes to step A2.

In step A2, the data unit identifier managing device 201 confirms whether the object to be checked exists or not. If there is an object to be checked, the processing goes to step A3. If there is no object to be checked, the processing goes to a completion step A5.

In step A3, the data unit referring device 602 confirms whether the object to be checked is linked with the motion data unit or not. If the object to be checked is linked with the motion data unit, the processing goes to step A4. If the object to be checked is not linked with the motion data unit, the processing goes to step A2.

In step A4, the object modifying information calculating device 604 refers the object motion data unit and carries out the motion processing corresponding to the contents of the object motion data unit. After completion of step A4, the processing goes to step A2.

In step A5, the information processing system terminates the processing corresponding to the motion description of the object.

Each data unit includes a combination of a plurality of attributes and the attribute values corresponding to the attributes. The link pointer of other data units linked with each data unit is also managed as one of the attributes. Users of the information processing system can modify the link pointer of the data unit via the input device 100.

In this way, since one motion data unit can be shared with a plurality of objects, the registration efficiency is increased. By linking a plurality of motion data units with one data unit, the motion processing can be set easily in response to a plurality of status. By separately managing the data units such as coordinate, shape, color and material and the motion data unit of the object, and examining the link among the data units such as coordinate, shape, color and material and the motion data unit, for example, the coordinate data unit or the motion data unit of the linked destination can be easily retrieved.

For example, by adding, modifying and deleting the link for the coordinate data unit, the motion of the object can be easily modified.

Further, since the motion data unit of the object is separately managed, for example, from the coordinate data unit, the motion data unit is easily formed, copied and deleted regardless of forming or deleting of the coordinate data unit.

Embodiment 6.

Figure 13:
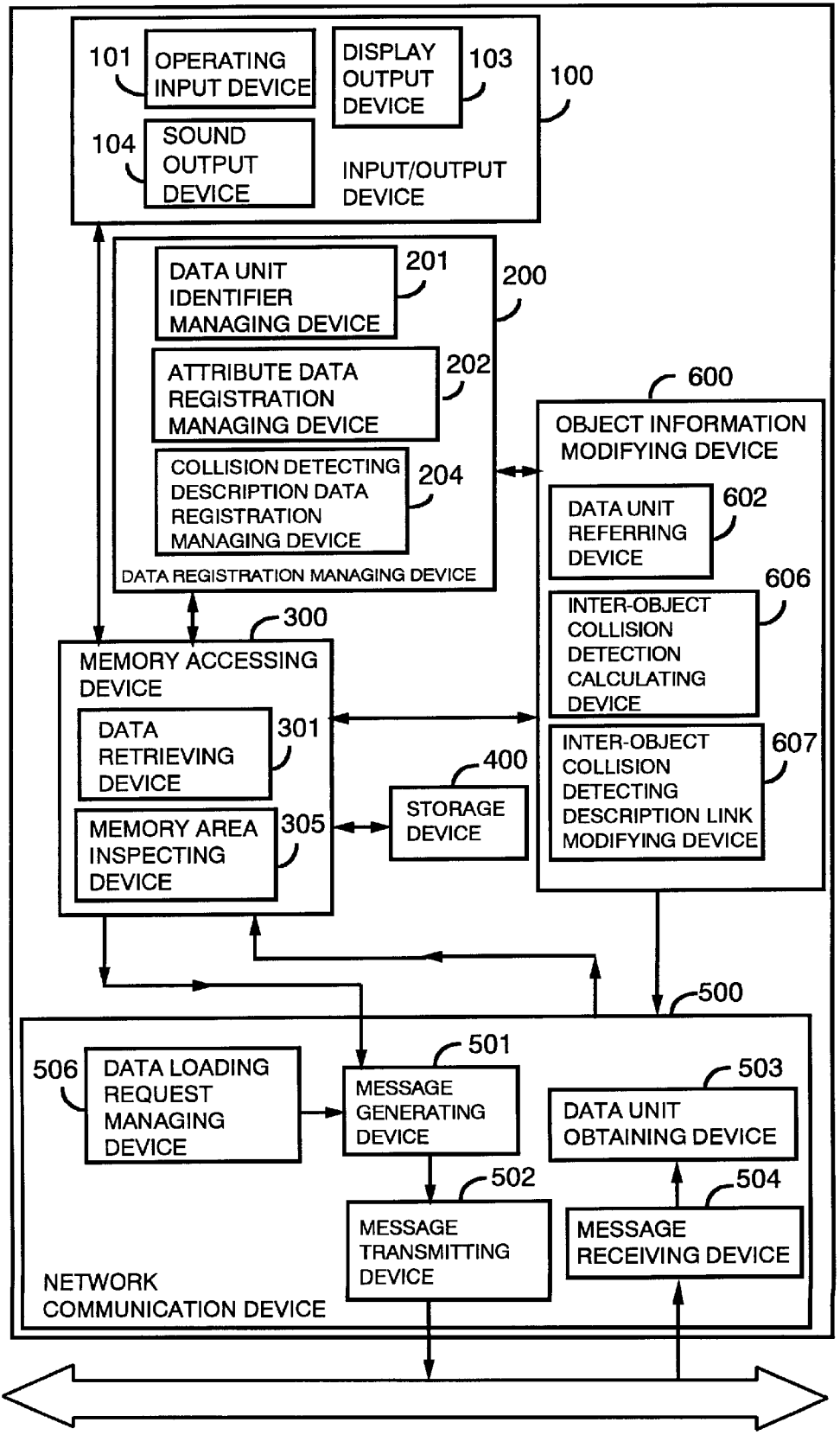
FIG. 13 shows another information processing system of the present invention.

A further embodiment of the present invention is described below using FIG. 13. FIG. 13 shows an information processing system and the network type information processing system according to a sixth embodiment.

In FIG. 13, a collision detecting description data registration managing device 204 is provided in the data registration managing device 200 and manages the collision detecting description data unit which is one of the motion data units. The collision detecting description data registration managing device 204 determines whether a plurality of objects contact each other or not between the virtual three dimensional space by the collision detecting description data unit via links. On the other hand, the object can be managed by referring, for example, the coordinate data unit from the collision detecting description data unit.

Further, the collision detecting description data registration managing device 204 links a plurality of collision detecting description data units to one of the objects.

An inter-object collision detection calculating device 606 is provided in the object information modifying device 600 and evaluates the collision detecting description data unit among the objects to carry out processing due to collision influences.

An inter-object collision detecting description link modifying device 607 is provided in the object information modifying device 600, and modifies the collision detection processing among a plurality of objects by addition, modification and deletion of the link.

In the sixth embodiment in FIG. 13, since the same or corresponding portions in the fifth embodiment in FIG. 11 have the same numbers, their detailed description are omitted and the differences between FIG. 13 and FIG. 11 are only described.

The object in the virtual three dimensional space to be output to the display output device 103 is detected whether it collides with other objects based on the collision detecting description data unit which is programmed in advance, to give the modification processing on the result of the calculation for simple movement.

The collision detecting description data unit is periodically processed by timer interruption. This processing calculates whether one object collides with other object at the interruption. The interruption processing by the timer is one branch of the processing request in the main loop as shown in the flowchart of FIG. 3C.

Figure 14:
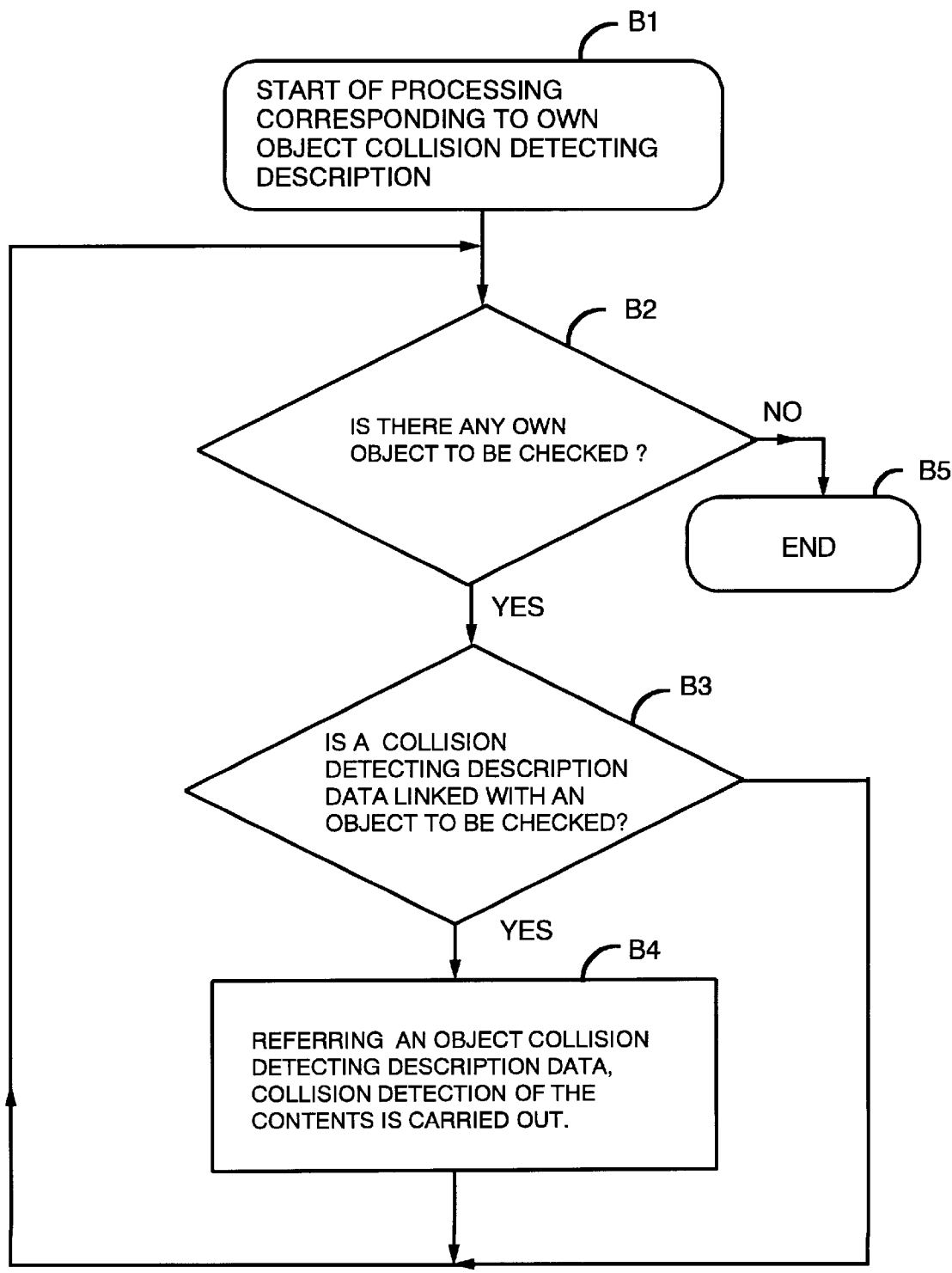
FIG. 14 is a flowchart showing a processing sequence of a collision detecting description data unit.

The processing of the collision detecting description data unit is described using the flowchart of FIG. 14. The collision detecting description data unit is handled equal with the data units regarding coordinate, shape, color and material of the object, and is managed by the collision detecting description data registration managing device 204.

The flowchart of the processing corresponding to the collision detecting description of the own object is described in reference to the collision detecting description data unit.

In step B1, the information processing system begins the processing corresponding to the collision detecting description of the object. After step B1, the processing goes to step B2.

In step B2, the data unit identifier managing device 201 confirms whether the object to be checked exists or not. If there is an object to be checked, the processing goes to step B3. If there is no object to be checked, the processing goes to a completion step B5.

In step B3, the data unit referring device 602 confirms whether the object to be checked is linked with the collision detecting description data or not. If the object to be checked is linked with the collision detecting description data unit, the processing goes to step B4. If the object to be checked is not linked with the collision detecting description data unit, the processing goes to step B2.

In step B4, the information processing system refers to the object collision detecting description data unit by the inter-object collision detection calculating device 606 and carries out the collision detection processing corresponding to the contents of the collision detecting description data unit. After completion of step B4, the processing goes to step B2.

In step B5, the information processing system terminates the processing corresponding to the collision detecting description.

Each data unit includes a combination of a plurality of attributes and the attribute values corresponding to the attributes. The link pointer of other data unit linked with each data unit is also managed as one of the attributes. Users of the information processing system can modify the link pointer of the data unit via the input/output device 100.

In this way, since one collision detecting description data unit can be shared with a plurality of objects, the registration efficiency is increased.

By linking a plurality of motion data units with one data unit, the collision detection processing can be set easily in response to a plurality of status. By separately managing the data units such as coordinate, shape, color and material and the collision detecting description data unit of the object, and examining the link between the coordinate data unit and the collision detecting description data unit, the coordinate data unit of the linked destination or the collision detecting description data unit can be easily retrieved. For example, by adding, modifying and deleting the link for the coordinate data unit, the collision detection processing of the object can be easily modified.

Further, since the collision detecting description data unit among a plurality of the objects is separately managed, for example, the collision detecting description data unit is easily formed, copied and deleted regardless of forming or deleting of the coordinate data unit.

Embodiment 7.

Figure 15:
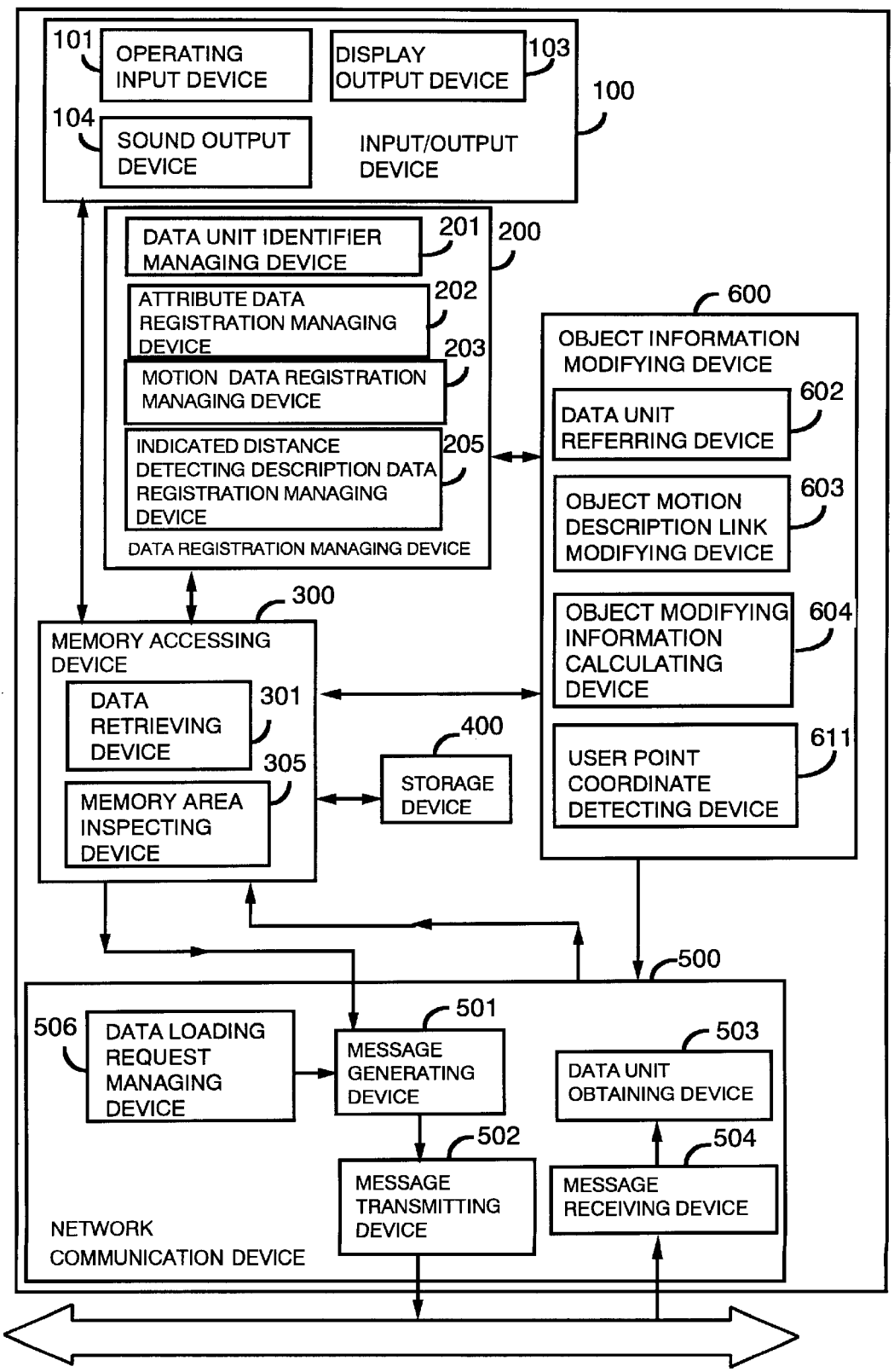
FIG. 15 shows another information processing system of the present invention.

A further embodiment of the present invention is described below using FIG. 15. FIG. 15 shows an information processing system or the network type information processing system according to a seventh embodiment. In FIG. 15, an indicated distance detecting description data registration managing device 205 is provided in the data registration managing device 200.

The indicated distance detecting description data registration managing device 205 orders the loading of the divided area data units regarding the data units on the object and the divided areas in the virtual three dimensional space based on the positional relationship between the object in the virtual three dimensional space and the user in the information processing system. The loaded divided area data unit is linked, for example, to the coordinate data unit regarding the object.

The data for indicating the virtual three dimensional space itself is also formed as an data unit as well as the data regarding the object in the virtual three dimensional space. By detecting the positional relationship between the object and the user frequently, the desired divided area data unit can be loaded minutely and gradually.

A coordinate detecting device 611 is provided in the object information modifying device 600 and detects the distance, for example, at a time for indicating the loaded divided area data unit.

In the seventh embodiment in FIG. 15, since the same or corresponding portions in the fifth embodiment in FIG. 11 have the same numbers, their detailed description are omitted and the differences between FIG. 15 and FIG. 11 are only described. In FIG. 15, the display is accompanied with sound.

When the position of the user in the virtual three dimensional space is detected to be near to the predetermined object by the predetermined distance based on the indicated distance detection description data unit programmed in advance, the divided area data unit based on the detecting result is loaded.

The indicated distance detection description data unit is periodically processed based on the distance between the user in the virtual three dimensional space and the object by timer interruption. The distance between the user and the object is calculated according to the shape and the position of the user and the shape and the position of the object, at the time the timer interruption occurs. The interruption processing by the timer is one branch of the processing request in the main loop as shown in the flowchart of FIG. 3C.

Figure 16:
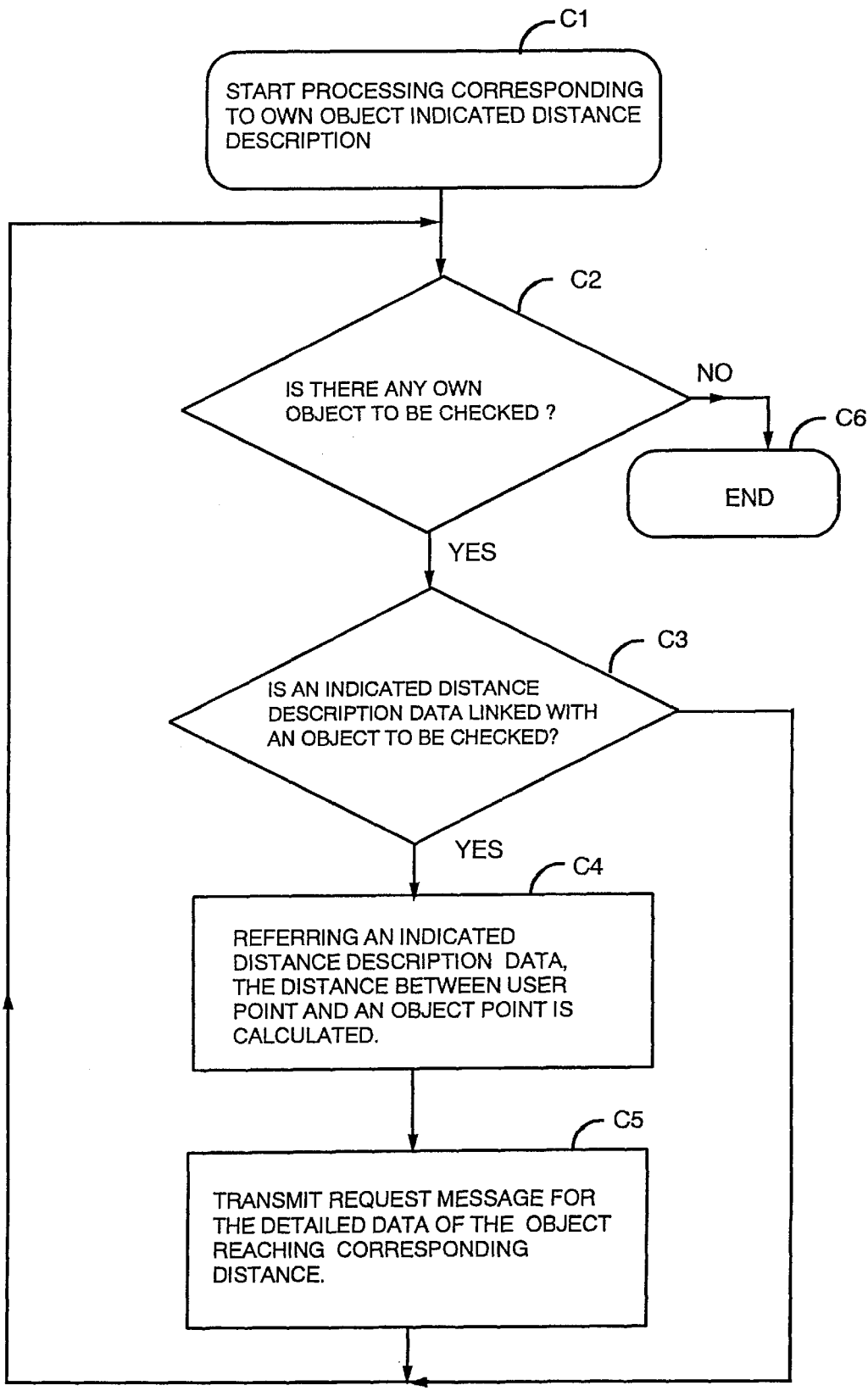
FIG. 16 is a flowchart showing a processing sequence for loading a data unit step by step.

The processing of the indicated distance detection description data unit is described using the flowchart of FIG. 16.

In step C1, the information processing system begins the processing corresponding to the indicated distance detection description data unit of own object. After step C1, the processing goes to step C2.

In step C2, the data unit identifier managing device 201 confirms whether the object to be checked exists or not. If there is an object to be checked, the processing goes to step C3. If there is no object to be checked, the processing goes to a completion step C6.

In step C3, the data unit referring device 602 confirms whether the object to be checked is linked with indicated distance detection description data unit or not. If the object to be checked is linked with the indicated distance detection description data unit, the processing goes to step C4. If the object to be checked is not linked with the indicated distance detection description data unit, the processing goes to step C2.

In step C4, the user point coordinate detecting device 611 determines the indicated distance detection description data unit and carries out the distance processing between the user point and the object point. After completion of step C4, the processing goes to step C5.

In step C5, the information processing system transmits a load requiring message which requires the loading of the predetermined data unit regarding the object reached the predetermined distance using the data loading request managing device 506 and the message transmitting device 502. After completing step C5, the processing goes to step C2.

In step C6, the information processing system terminates the processing corresponding to the indicated distance detection description data unit of the object.

Each data unit includes a combination of a plurality of attributes and the attribute values corresponding to the attributes. The link pointer of other data unit linked with each data unit is also managed as one of the attributes. Users of the information processing system can modify the link pointer of the data unit via the input/output device 100.

In this way, by detecting the positional relationship between the object and the user in the information processing system frequently, the desired divided area data unit can be loaded minutely and gradually, and can be indicated to the input/output device 100. Therefore, the continuous motion of the object can be easily expressed.

Embodiment 8.

Figure 17:
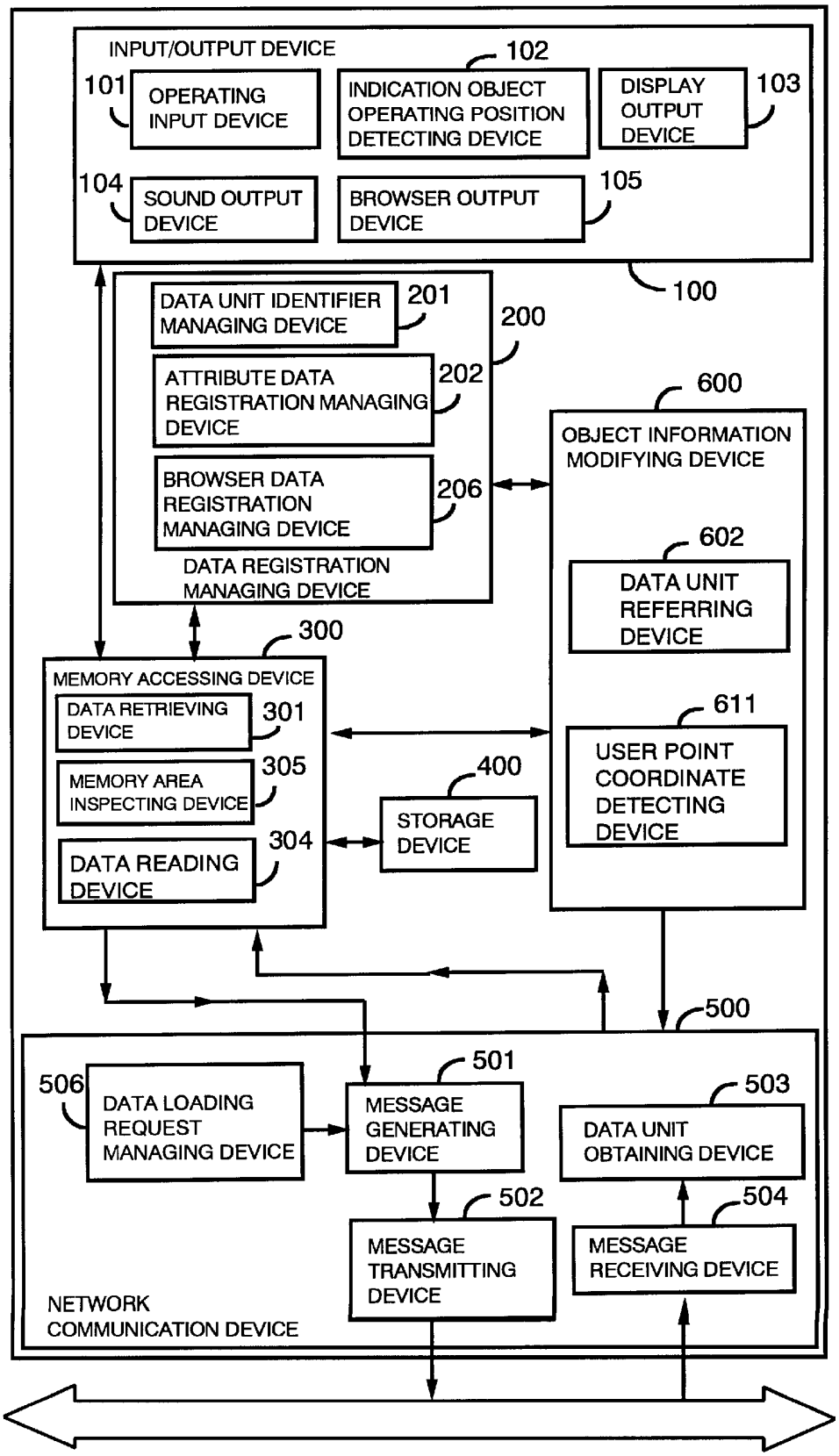
FIG. 17 shows another information processing system of the present invention.

A further embodiment of the present invention is described below using FIG. 17. FIG. 17 shows an information processing system or the network type information processing system according to an eighth embodiment.

In FIG. 17, an indication object operating position detecting device 102 is provided in the input/output device 100, which detects whether the object is selected by pointing an indicated divided area of the object on the display monitor of the virtual three dimensional space using the pointer device.

A browser output device 105 is provided in the input/output device 100, which stores the destination of the hyper-link as one of the attributes of each data unit. When the pointer-device indicates the data unit with the specified mode, the browser output device 105 starts object data and browse data unit of the destination of the linked hyper-link. The display is accompanied with sound.

A browser data registration managing device 206 is provided in the data registration managing device 200, and is able to add a destination of the hyper-link which is browsed when the various conditions are satisfied and a description for modifying the type of the browsing, as the hyper-link information.

In the eighth embodiment in FIG. 17, since the same or corresponding portions in the first embodiment in FIG. 1A have the same numbers, their detailed description are omitted and the differences between FIG. 17 and FIG. 1A are only described.

The operation for the object, which is output to the input/output device 100, in the virtual three dimensional space, using the input/output device 100 such as a pointer, is carried out on the bases of the motion data unit programmed in advance. The operation for the object is carried out at the time of interruption from this input/output device 100. The interruption processing by this input/output device 100 is one branch of the processing request in the main loop as shown in the flowchart of FIG. 3C. The click input from the mouse-pointer is one of the branches of the processing request in the main loop as shown in the flowchart of FIG. 3C. By this processing for the click input, it is detected whether the object in the virtual three dimensional space is operated or not.

Figure 18:
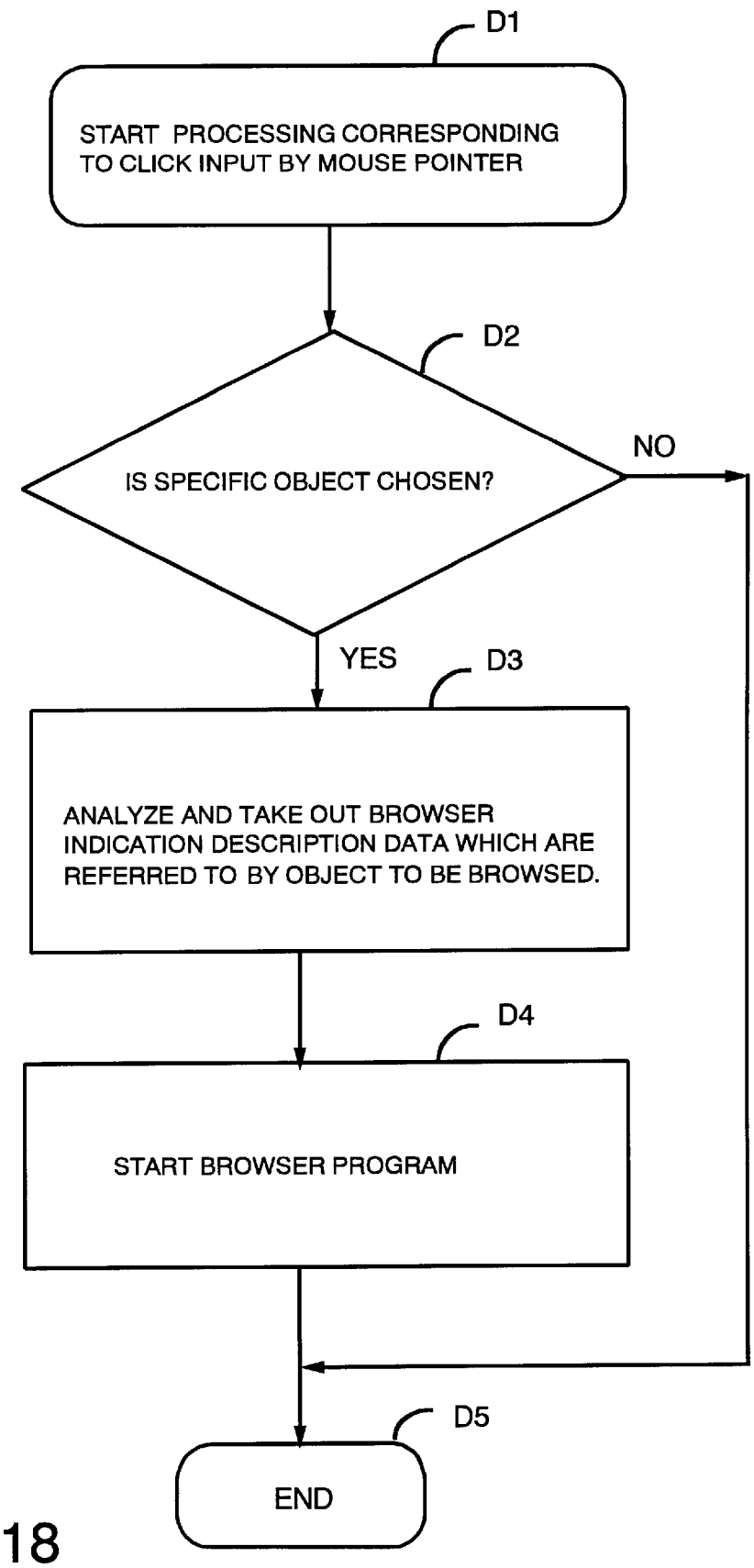
FIG. 18 is a flowchart showing a processing sequence of a browser data unit.

The processing of the browser data unit for the object indicated in the virtual three dimensional space is described using a flowchart of FIG. 18. The reaction processing at clicking the object to be browsed by the mouse-pointer as the input/output device 100 is set in this browser data unit.

In step D1, the information processing system begins the processing for the click input from the mouse-pointer. After step D1, the processing goes to step D2.

In step D2, the indication object operating position detecting device 102 confirms whether the specific object is selected or not. When the specific object is selected, the processing goes to step D3. When the specific object is not selected, the processing goes to step D5.

In step D3, the information processing system analyzes the data unit, which is referred by the object to be browsed, using the browser data registration managing device 206 and the data reading device 304, and extracts the necessary information. After completion of step D3, the processing goes to step D4.

In step D4, the information processing system starts object data for indicating browser using the browser output device 105. After completion of step D4, the processing goes to step D5.

In step D5, the information processing system terminates the processing for the click input from the mouse-pointer.

Each data unit constructed by a combination of a plurality of attributes and the attribute values corresponding to the attributes. The link pointer of other data unit linked with each data unit is also managed as one of the attributes. The users of the information processing system can modify the link pointer of the data unit via the input/output device 100. In this way, it is possible to start the object based on the data unit hyper-linked to one data unit.

Embodiment 9.

Figure 19:
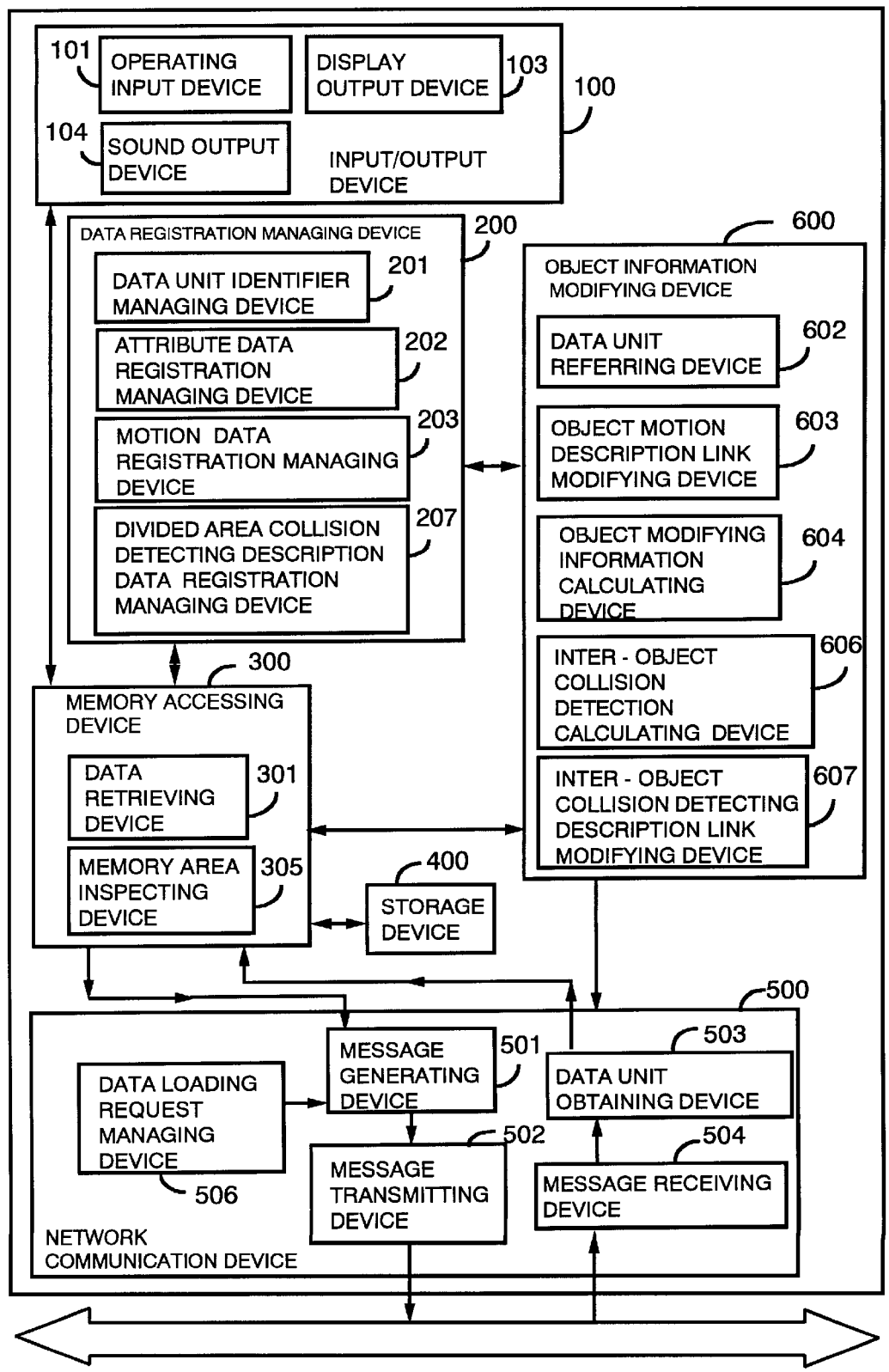
FIG. 19 shows another information processing system of the present invention.

A further embodiment of the present invention is described below using FIG. 19. FIG. 19 shows an information processing system or the network type information processing system according to a ninth embodiment.

In FIG. 19, a divided area collision detecting description data registration managing device 207 is provided in the data registration managing device 200, and manages the object by referring the collision detecting description data units among a plurality of objects in the virtual three dimensional space via the link from the specified divided area in the space.

An inter-object collision detection calculating device 606 is provided in the object information modifying device 600, evaluates and manages the collision detection processing for every divided area in each space.

An inter-object collision detecting description link modifying device 607 is provided in the object information modifying device 600, and modifies the collision detection processing among a plurality of objects by adding, modifying and deleting the link.

In the ninth embodiment in FIG. 19, since the same or corresponding portions in the fifth embodiment in FIG. 11 have the same numbers, their detailed description are omitted and the differences between FIG. 19 and FIG. 11 are only described.

The object moving in the virtual three dimensional space, which is output to the input/output device 100, is detected whether it collides with other objects based on the collision detecting description data unit which is programmed in advance, and then the modification processing for the calculation result of simple movement is carried out.

The processing based on the collision detecting description data unit of this embodiment is carried out for the data unit regarding the object for every divided area. The motion data unit for carrying out the collision detection processing is linked with each object in each divided area.

Figure 20:
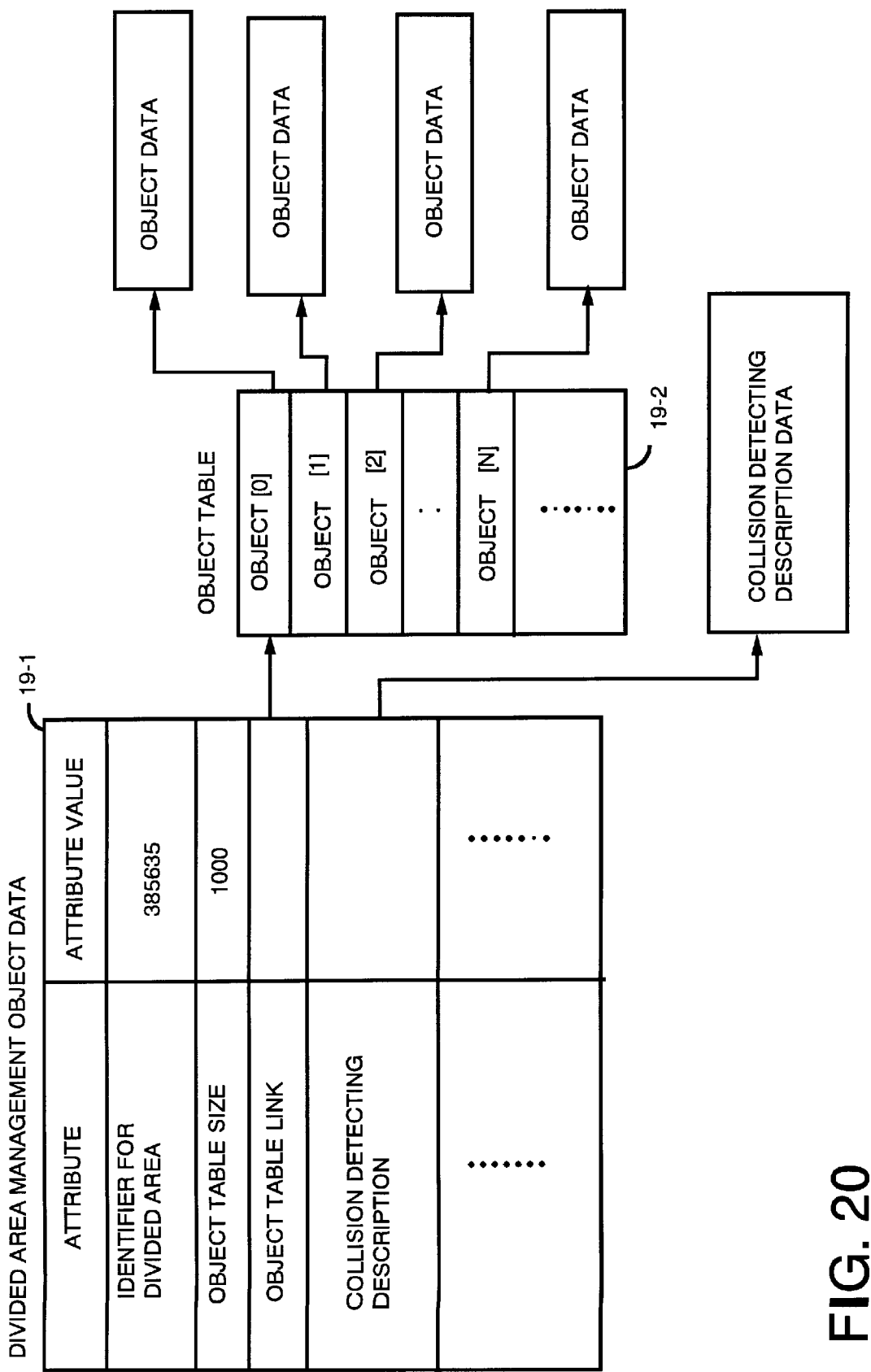
FIG. 20 shows a collision detecting description data unit and linkage between various data units for every divided area.

The structure of this motion data unit for carrying out the collision detection processing for every divided area is described using FIG. 20. A divided area management data unit 19-1 sets each object linked with the divided area data unit in each divided area. An object table 19-2 sets pointers of each data unit regarding each object set in the divided area management data unit 19-1.

A divided area collision detecting description data registration managing device 207 registers the collision detecting description data unit. An inter-object collision detection calculating device 606 carries out the collision detection processing. Further, an inter-object collision detecting description link modifying device 607 modifies the collision detecting description data unit according to the various conditions.

The processing of the collision detecting description data unit for every divided area is carried out by timer interruption. In the above processing, both objects are calculated based on the shape and the position of an object, and the shape and the position of other objects, at the time of interruption. The processing in response to the timer interruption is one branch of the processing request in the main loop as shown in the flowchart of FIG. 3C.

Figure 21:
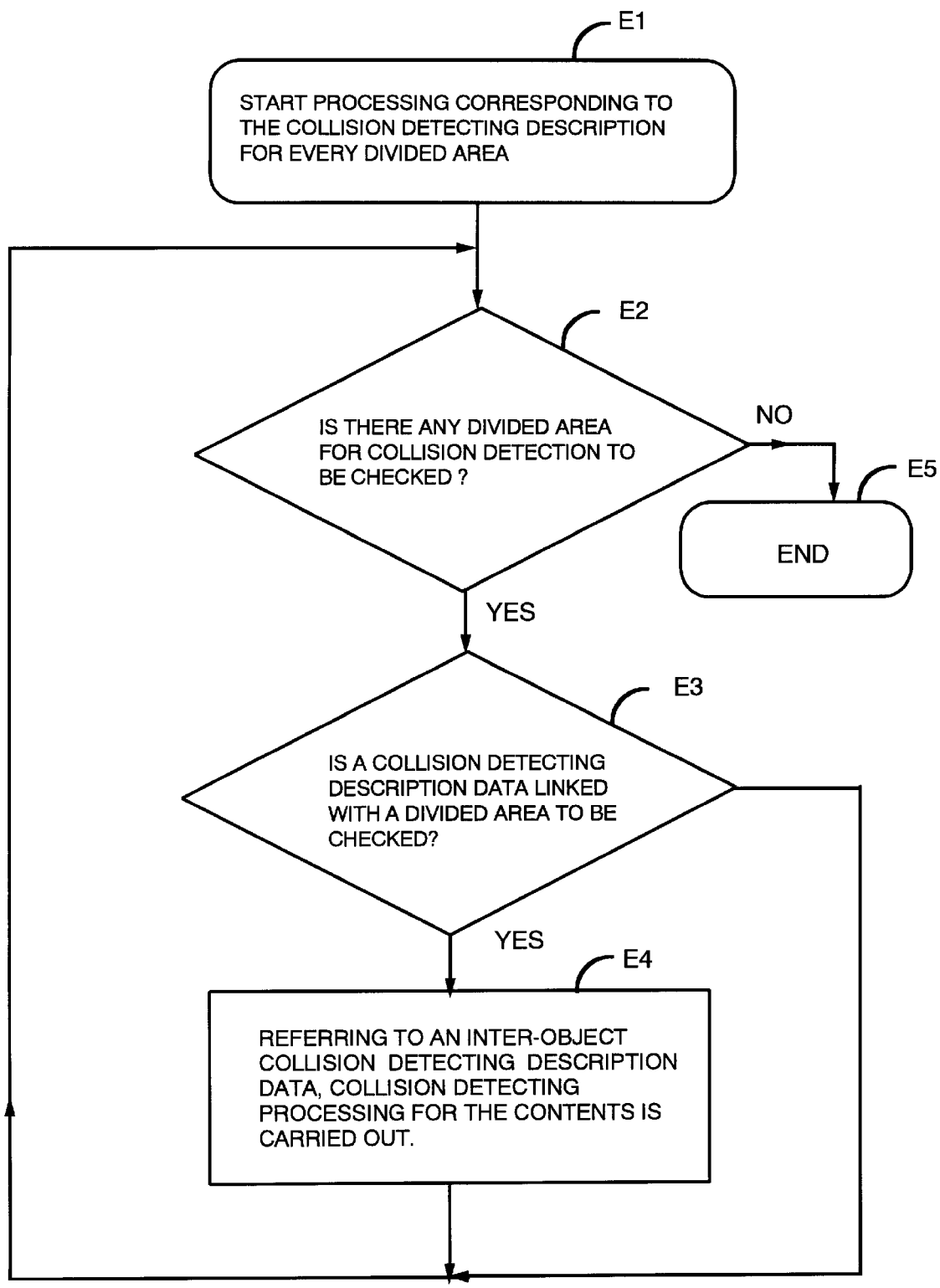
FIG. 21 is a flowchart showing a processing sequence of a collision detecting description data unit for every divided area.

The processing of the object collision detecting description data unit is described using the flowchart of FIG. 21. The collision detecting description data unit is handled equal with the three dimensional model data units such as coordinate, shape, color and material of the object and managed in the data unit identifier managing device 201 and the attribute data registration managing device 202.

In step E1, the information processing system begins the processing corresponding to the collision detecting description for every divided area. After step E1, the processing goes to step E2.

In step E2, the data unit identifier managing device 201 confirms whether a divided area for the collision detection to be checked exists or not. If there is the divided area to be checked, the processing goes to step E3. If there is no divided area to be checked, the processing goes to step E5.

In step E3, the data unit referring device 602 confirms whether the collision detecting description data unit is linked with the divided area to be checked. If the collision detecting description data unit is linked with the divided area to be checked, the processing goes to step E4. If the collision detecting description data unit is not linked with the divided area to be checked, the processing goes to step E2.

In step E4, the inter-object collision detection calculating device 606 determines the object collision detecting description data unit and carries out the collision detection processing corresponding to the contents of the object collision detecting description data unit. After step E4, the processing goes to step E2. In step E5, the information processing system terminates the processing corresponding to the collision detecting description for every divided area.

Each data unit includes a combination of a plurality of attributes and the attribute values corresponding to the attributes. The link pointer of other data unit linked with each data unit is also managed as one of the attributes. Users of the information processing system can modify the link pointer of the data unit via the input/output device 100.

In this way, since one collision detecting description data unit can be shared with a plurality of objects in one divided area, the registration efficiency is increased. The different collision detecting description data unit can be set for every divided area. Further, since the collision detecting description data unit set among a plurality of the objects is separately managed, for example, from the coordinate data unit, the collision detecting description data unit can be formed, copied and deleted regardless of forming or disappearing of the coordinate data unit.

Embodiment 10.

Figure 22:
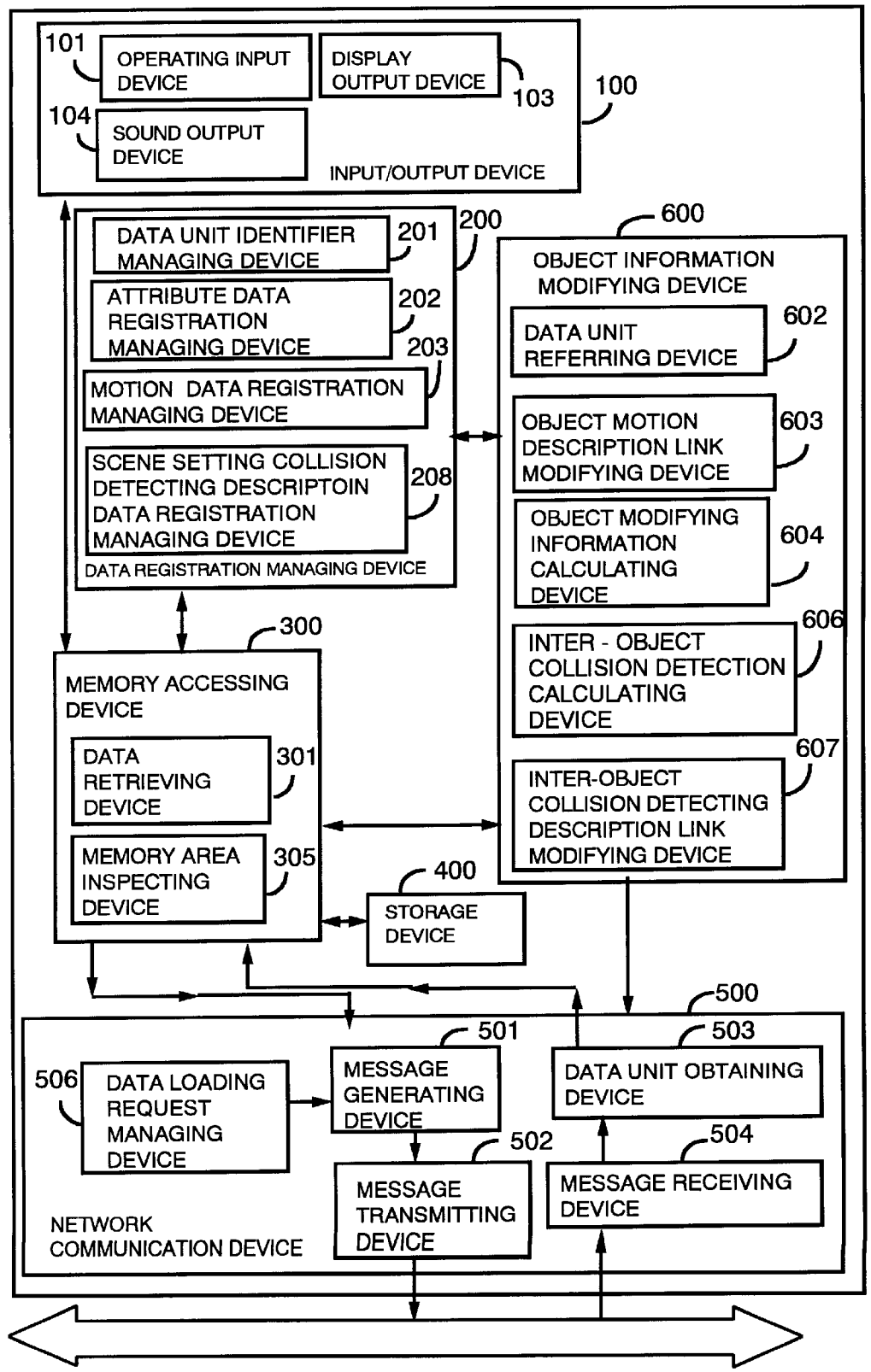
FIG. 22 shows another information processing system of the present invention.

A further embodiment of the present invention is described below using FIG. 22. FIG. 22 shows an information processing system or the network type information processing system according to a tenth embodiment.

In FIG. 22, a scene setting collision detecting description data registration managing device 208 is provided in the data registration managing device 200, and they manage the objects by referring the data units such as coordinate, shape, color and material regarding the objects in the virtual three dimensional space and the motion data units for detecting the collision among a plurality of objects, via information object corresponding to the specific scene in the virtual three dimensional space.

An inter-object collision detection calculating device 606 is provided in the object information modifying device 600, and they evaluate the collision detecting description data units between the objects for every scene and carries out processes according to the succeeding influences of the collision.

An inter-object collision detecting description link modifying device 607 is provided in the object information modifying device 600, and they can modify the collision detection processing among a plurality of objects by adding, modifying and deleting the link.

In the tenth embodiment in FIG. 22, since the same or corresponding portions in the fifth embodiment in FIG. 11 have the same numbers, their detailed description are omitted and the differences between FIG. 22 and FIG. 11 are only described.

The object moving in the virtual three dimensional space, which is output to the input/output device 100, is detected whether it collides with other object based on the collision detecting description data unit which is programmed in advance, and then the modification processing for the calculation result of the simple movement is carried out.

The processing based on the collision detecting description data unit of this embodiment is carried out for the data unit regarding the object for every shared scene. The motion data unit for carrying out the collision detection processing is linked with each object in each scene.

Figure 23:
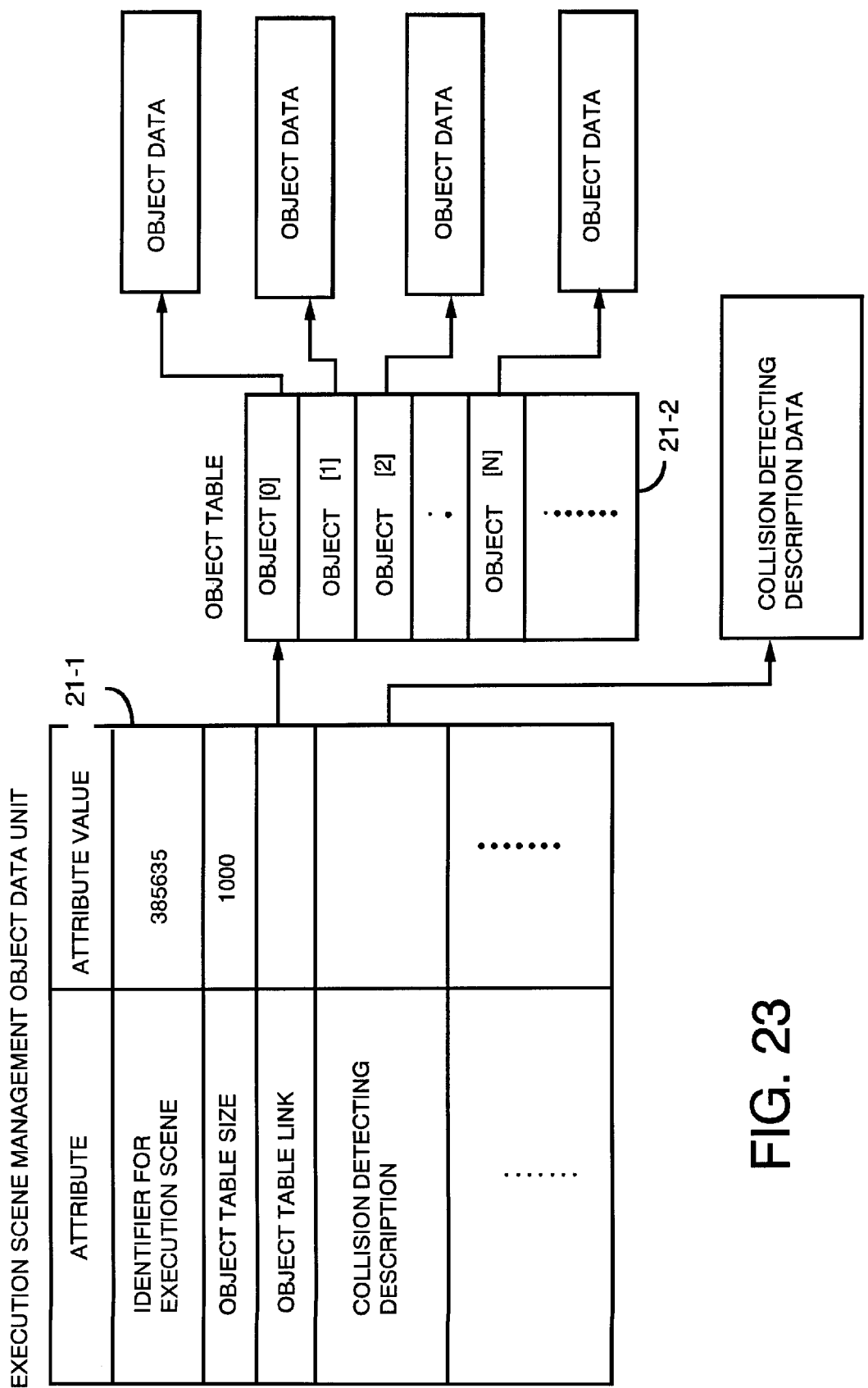
FIG. 23 shows a shows a collision detecting description data unit and linkages between various data units for every divided area.

The structure of this motion data unit for the collision detection processing for every execution scene is described using FIG. 23.

The execution scene data unit 21-1 sets each object linked with the execution scene managing data unit. An object table 21-2 sets pointers of each data unit regarding each object set in the execution scene managing data unit 21-1.

A scene setting collision detecting description data registration managing device 208 registers the collision detecting description data unit. An inter-object collision detection calculating device 606 carries out the collision detection processing. Further, an inter-object collision detecting description link modifying device 607 modifies the collision detecting description data unit.

The processing of the collision detecting description data unit for every execution scene is carried out by timer interruption. In the above processing, the both objects are calculated whether they collide or not based on the shape and the position of an object at the time of interruption, and the shape and the position of other objects. The processing in response to the timer interruption is one branch of the processing request in the main loop as shown in the flowchart of FIG. 3C.

Figure 24:
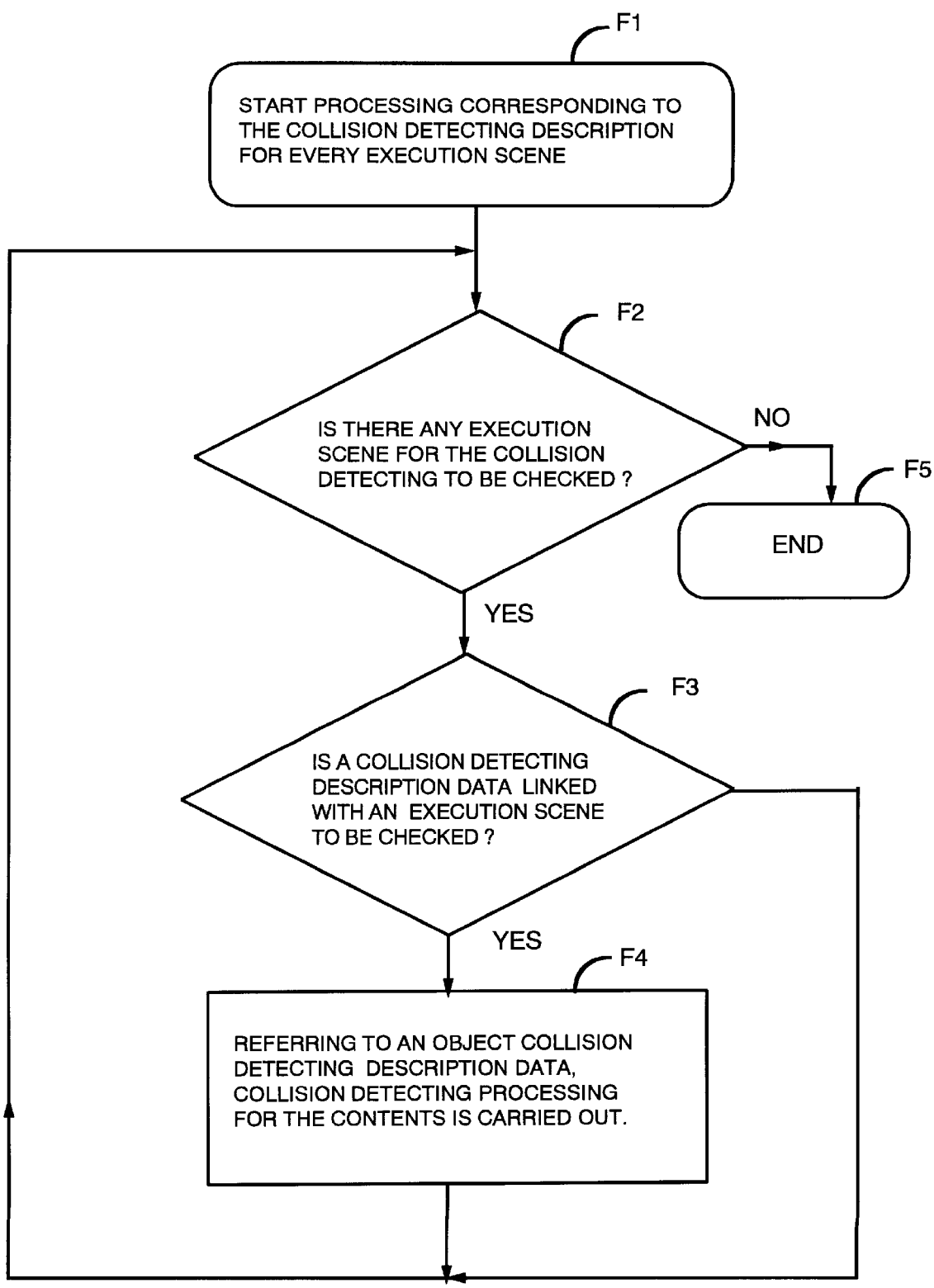
FIG. 24 is a flowchart showing a processing sequence between a collision detecting description data unit and various data units for every execution scene.

The processing of the object collision detecting description data unit is described using the flowchart of FIG. 24. The collision detecting description data unit is handled equal with the three dimensional model data units regarding coordinate, shape, color and material of the object, and managed by the scene setting collision detecting description data registration managing device 208.

In step F1, the information processing system begins the processing corresponding to the collision detecting description for every execution scene. After step F1, the processing goes to step F2.

In step F2, the data unit identifier managing device 201 confirms whether a execution scene for the collision detection to be checked exists or not. If there is the execution scene to be checked, the processing goes to step F3. If there is no execution scene to be checked, the processing goes to step F5.

In step F3, the data unit referring device 602 confirms whether the collision detecting description data unit is linked with the execution scene to be checked. If the collision detecting description data unit is linked with the execution scene to be checked, the processing goes to step F4. If the collision detecting description data unit is not linked with the execution scene to be checked, the processing goes to step F2.

In step F4, the inter-object collision detection calculating device 606 determines the object collision detection data unit and carries out the collision detection processing corresponding to the contents of the object collision detection data unit. After step F4, the processing goes to step F2. In step F5, the information processing system terminates the processing corresponding to the collision detecting description for every execution scene.

Each data unit includes a combination of a plurality of attributes and the attribute values corresponding to the attributes. The link pointer of other data unit linked with each data unit is also managed as one of the attributes. Users of the information processing system can modify the link pointer of the data unit via the input/output device 100.

In this way, since one collision detecting description data unit can be shared with a plurality of objects in one execution scene, the registration efficiency is increased. The different collision detecting description data units can be set for every execution scene. Further, since the collision detecting description data unit set among a plurality of the objects is separately managed, for example, from the coordinate data unit, the collision detecting description data unit can be formed, copied and deleted regardless of forming or disappearing of the coordinate data unit.

Embodiment 11.

Figure 25:
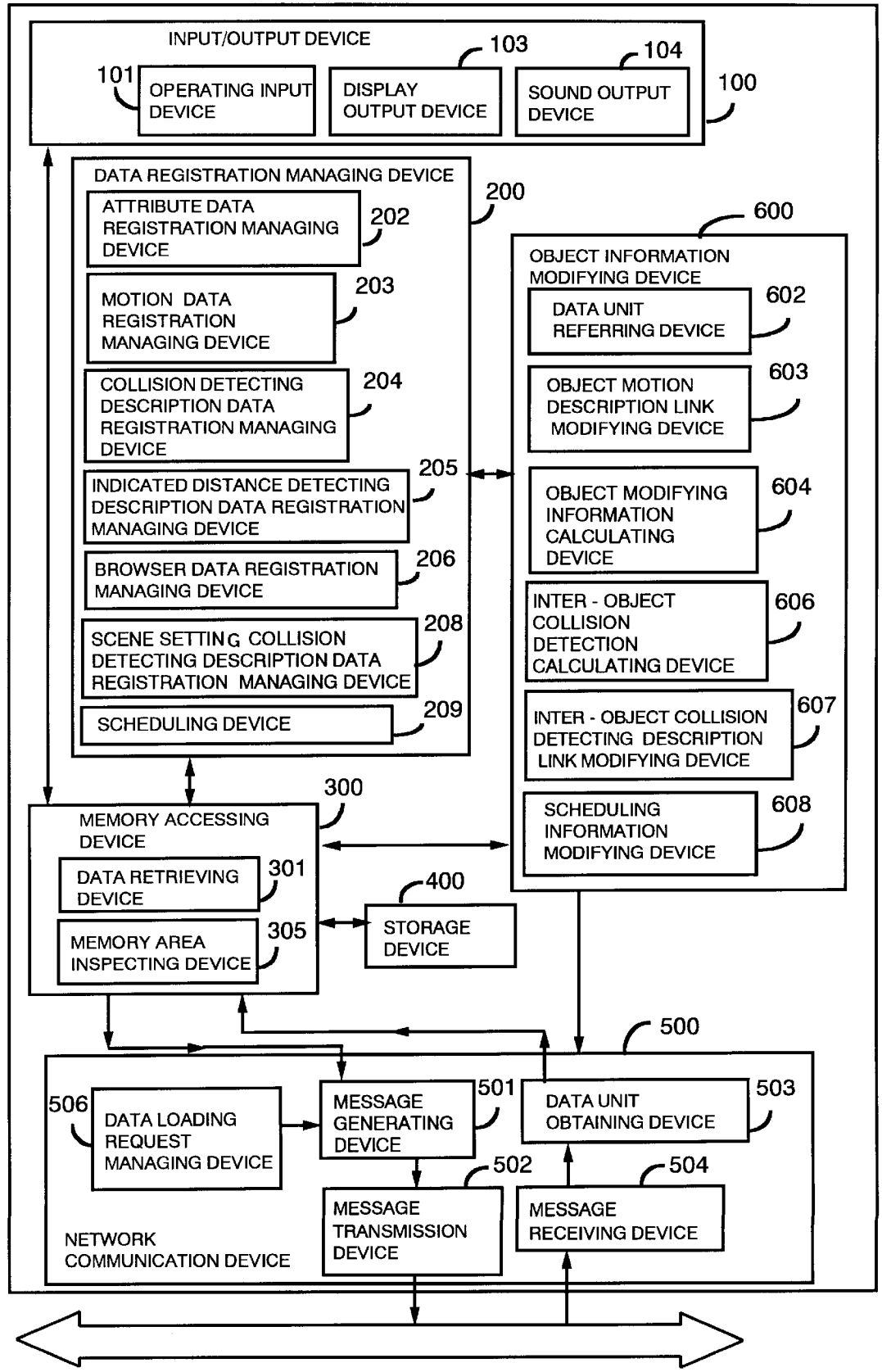
FIG. 25 shows another information processing system of the present invention.

A further embodiment of the present invention is described below using FIG. 25. FIG. 25 shows an information processing system or the network type information processing system according to an eleventh embodiment.

In FIG. 25, a scheduling device 209 is provided in the data registration managing device 200. The scheduling device 209 registers and manages on the time axis the link-pointers of the data units such as coordinate, shape, color and material regarding the objects in the virtual three dimensional space, the motion data units such as the inter-object collision detecting description data units, and the various data units such as other divided area information and the scene information, and determines the timing for use of those data units.

A scheduling information modifying device 608 is provided in the object information modifying device 600, and they add, modify, and delete the link in response to the scheduling information and modify the utilization of the information corresponding to each time zone.

In the eleventh embodiment in FIG. 25, since the same or corresponding portions in the sixth embodiment in FIG. 13 have the same numbers, their detailed description are omitted and the differences between FIG. 25 and FIG. 13 are only described.

Figure 26:
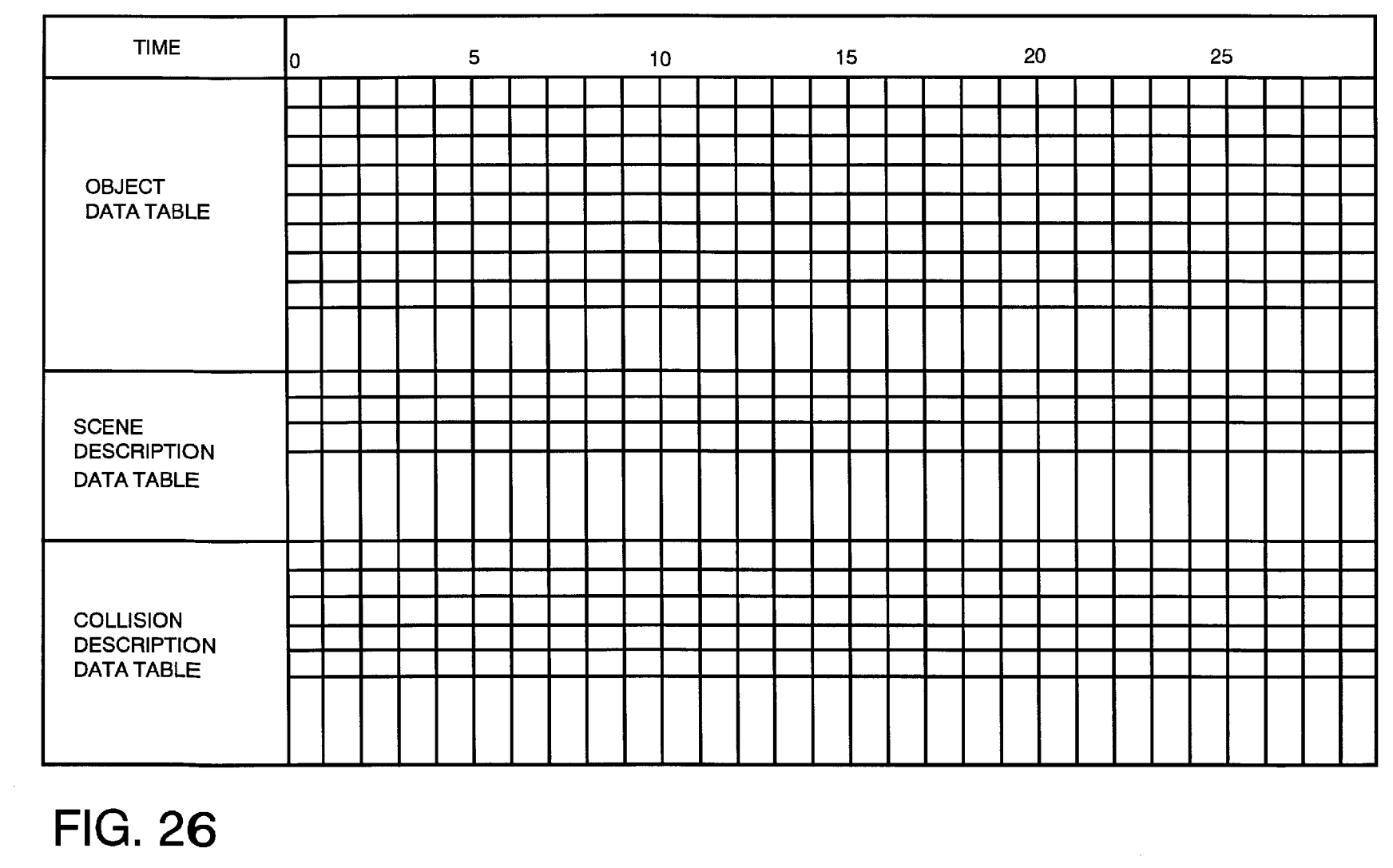

Next, a scheduling method using a time table which switches the data unit regarding the object by time is described using FIG. 26. FIG. 26 is a time table for setting the data unit regarding the object which is switched at a desired time and the various data units regarding the object in the virtual three dimensional space is set at any time columns in the time table.

Data units are set at the object table, the scene table and the collision detection table of the time table based on their attributes. Pointers to each data unit for setting the link are set on each table.

Further, the data units such as coordinate, shape, color and material are set on the object table. The divided area data unit and so on is set on the scene table. The motion data units such as the collision detecting description data unit are set on the collision detection table.

Figure 27:
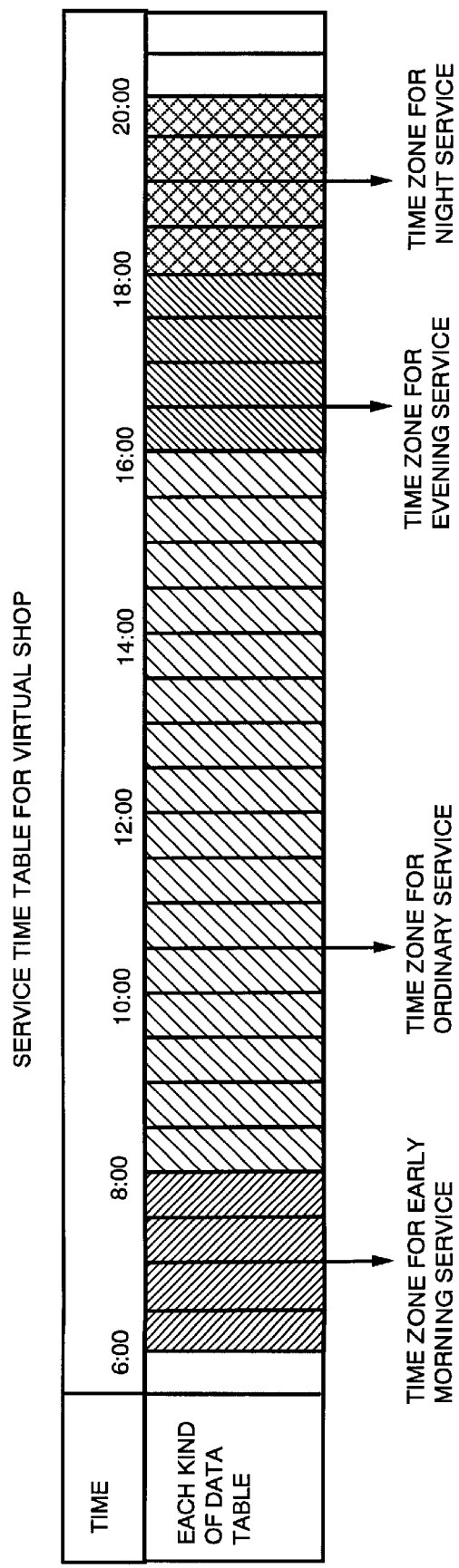
FIG. 27 is a conceptual time table regarding a time scheduling management of a virtual shopping center.

Next, for example, a virtual shopping street in the virtual three dimensional space using this time table is described below using FIG. 27.

It is possible for users to use the virtual shopping street (so called virtual mall) all day long via the internet. However, an opening and closing time are set since it is necessary for the shops to change layouts or arrange new shopping comers and so on.

Further, the contents of the shop can be modified according to the available time even in the same shop. For example, as for the contents of the shop, there are a discount service in the ordinary early morning, a service for the special time zone and a midnight service for adults and so on.

The time scheduling processing based on the time table is periodically carried out by the timer interruption. The time scheduling processing due to the time table of FIG. 27 refers the new time table column for every thirty minutes, and modifies the status of the link among a plurality of data units regarding an object.

Figure 28:
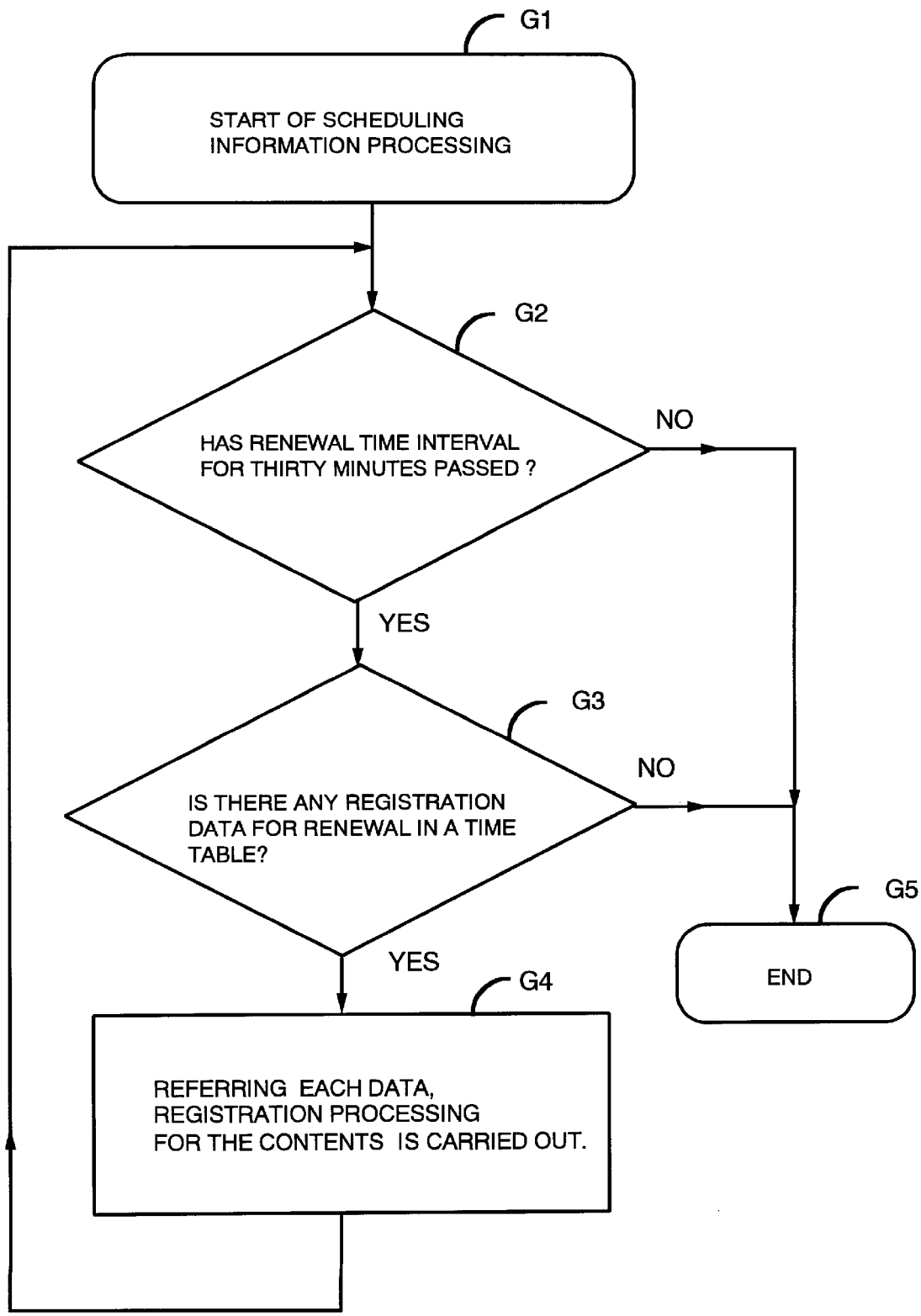
FIG. 28 is a flowchart showing a processing sequence regarding a time scheduling management.

This registration modifying processing for modifying the link status among a plurality of data units is described below using a flowchart of FIG. 28.

In step G1, the information processing system begins the renewal processing of the scheduling information. After step G1, the processing goes to step G2.

In step G2, the scheduling device 209 confirms whether thirty minutes as the renewal time interval have passed or not. If thirty minutes have passed, the processing goes to step G3. If thirty minutes have not passed, the processing goes to step G5.

In step G3, the scheduling device 209 confirms whether there is a registration data for renewal or not in the time table. If there is such a modified data unit, the processing goes to step G4. If there is not such a modified data unit, the processing goes to step G5.

In step G4, the attribute data registration managing device 202, the motion data registration managing device 203, the collision detecting description data registration managing device 204, the indicated distance detecting description data registration managing device 205, the browser data registration managing device 206, the divided area collision detecting description data registration managing device 207 and the scene setting collision detecting description data registration managing device 208 determine various data units, and carry out the registration processing for linking each of various data units with the data unit regarding the desired object. After the completion of step G4, the processing goes to step G3.

In step G5, the information processing system terminates the registration processing of the scheduling information.

The users of the information processing system can modify the pointer linked to various data units set on the time table via the input/output device 100.

In this way, the data units such as coordinate, shape, color and material regarding the objects in the virtual three dimensional space can be easily modified according to the time zone.

The motion data units such as the collision detection also can be easily set according to the time zone. Further, the scene where the object is displayed can be easily modified according to the time zone.

Embodiment 12.

Figure 29:
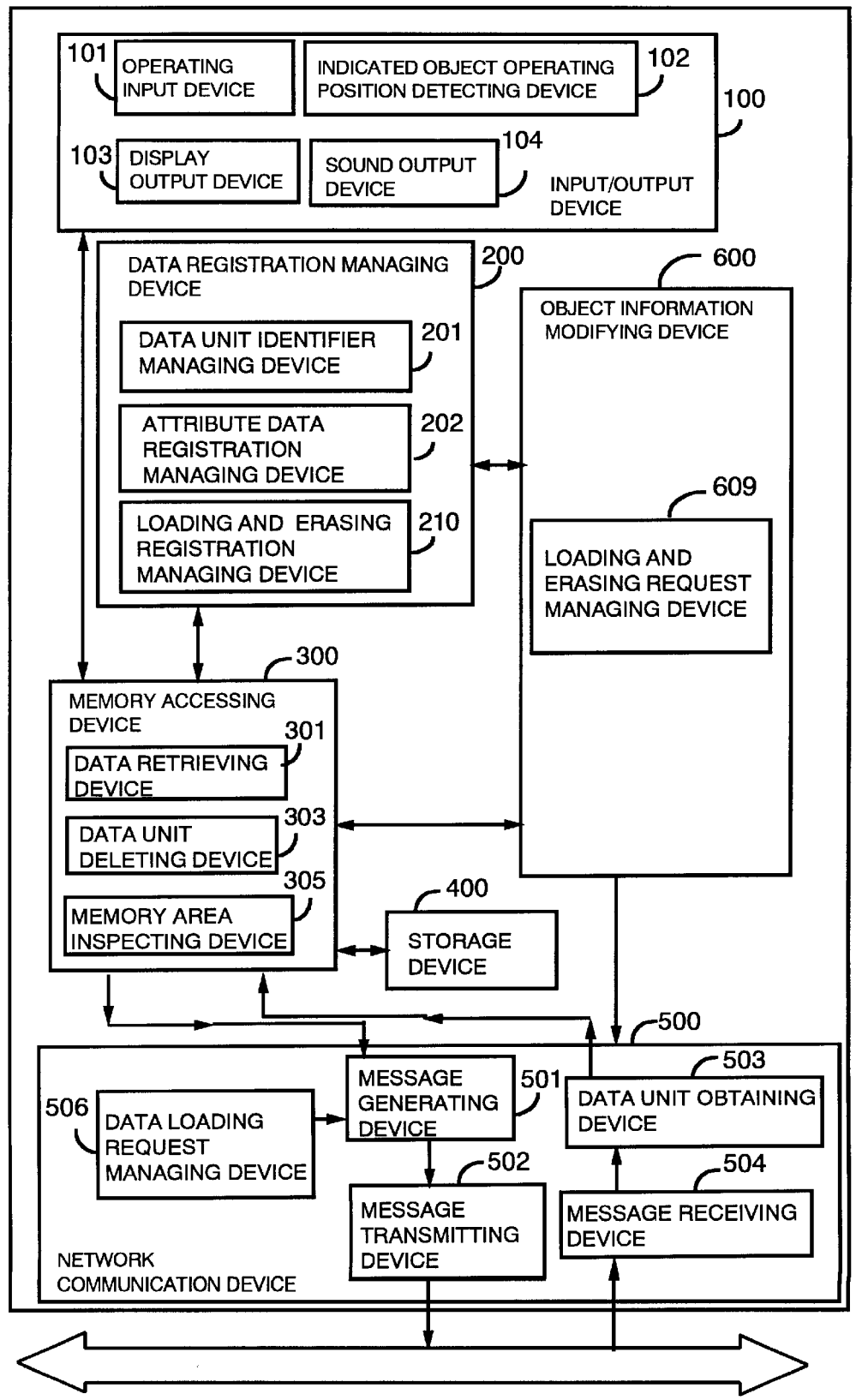
FIG. 29 shows another information processing system of the present invention.

A further embodiment of the present invention is described below using FIG. 29. FIG. 29 shows an information processing system or the network type information processing system according to a twelfth embodiment.

In FIG. 29, a loading and erasing registration managing device 210 is provided in the data registration managing device 200, and carries out the processing based on the loading and erasing data unit so as to load or erase the data units regarding the objects in the virtual three dimensional space for any data unit during the operation of the system.

A loading and erasing request managing device 609 is provided in the object information modifying device 600, and confirms the conditional portion in the motion data units for loading or erasing at any predetermined timing, and notify the memory accessing device 300 when it meets the conditions.

A data unit deleting device 303 is provided in the memory accessing device 300, and they erase the unnecessary data units forcibly based on the memory capacity of the storage device 400 in the information processing system.

A memory area inspecting device 305 is provided in the memory accessing device 300, and confirms whether the storage device 400 has a sufficient memory capacity for recording the data unit or not, before each information processing system records the data unit in the storage device 400.

A message generating device 501 is provided in the network communication device 500, and they start when loading the data unit and generate the messages for requesting the corresponding data unit to other terminal.

A message transmitting device 502 is provided in the network communication device 500, and they transmit the messages generated by the message generating device 501.

In the twelfth embodiment in FIG. 29, since the same or corresponding portions in the first embodiment in FIG. 1A have the same numbers, their detailed description are omitted and the differences between FIG. 29 and FIG. 1A are only described.

For example, the system including a plurality of virtual spaces according to the contents of the courses in the virtual class rooms where the courses are given in the virtual three dimensional space is described below using FIG. 30A.

The data units regarding the unnecessary virtual spaces are deleted from the memory since the memory of the computer is largely consumed if the data units regarding various virtual spaces are loaded without deleting.

An example of the object data 26-1 in the loading and erasing data unit as a motion data unit for loading or erasing deletes the loaded data unit from the memory before loading the data unit regarding the virtual spaces as shown in FIG. 30B.

Figure 31:
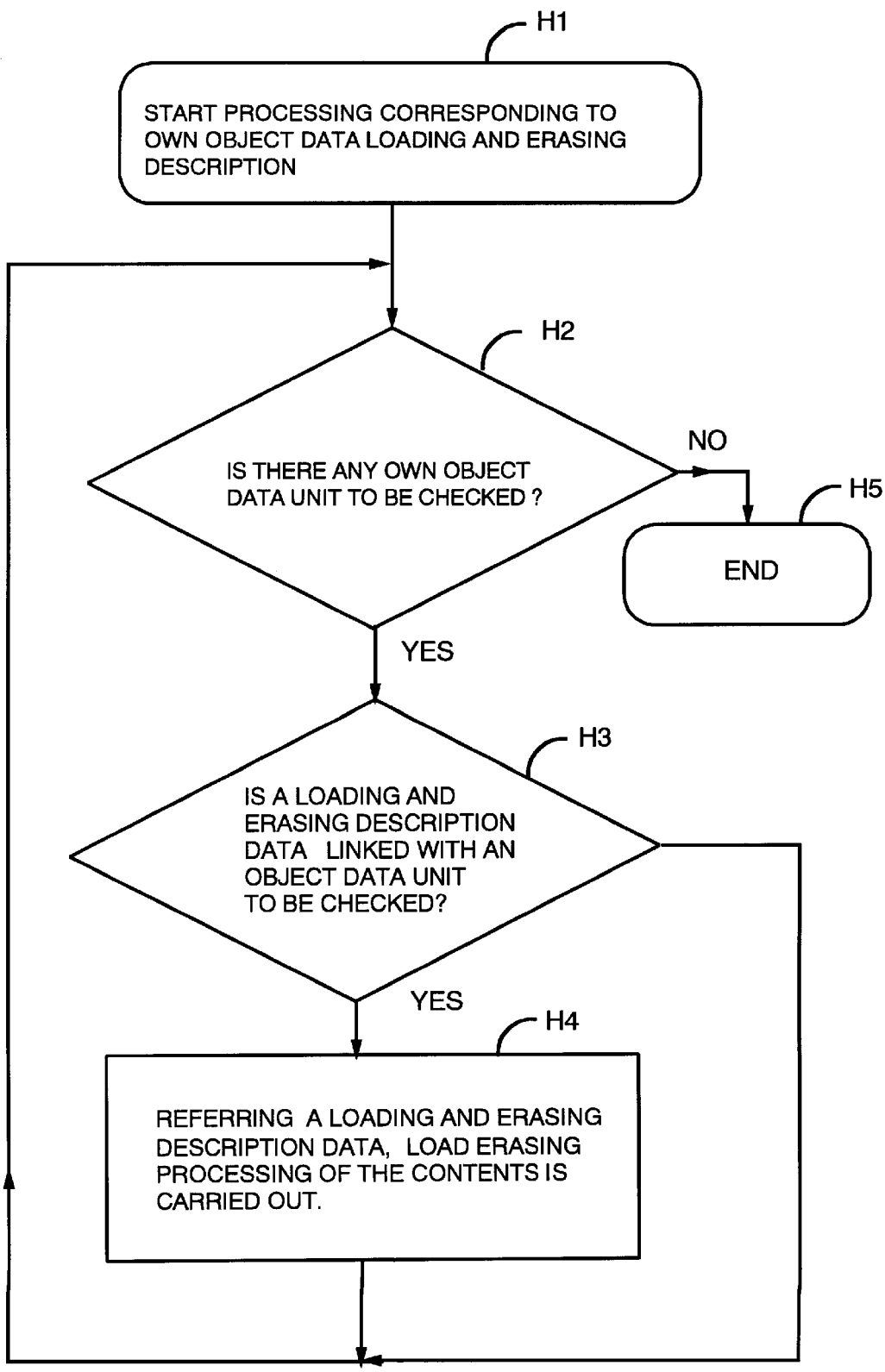
FIG. 31 is a flowchart showing a processing sequence regarding a data loading and erasing data unit.

This loading and erasing data unit is periodically processed by timer interruption with a short time interval. The processing in response to the timer interruption is one branch of the processing request in the main loop as shown in the flowchart of FIG. 3C. The processing of the loading and erasing data unit as one of the processing of the timer interruption is described below using the flowchart of FIG. 31.

In step H1, the information processing system begins the processing based on the own loading and erasing data unit. After step H1, the processing goes to step H2.

In step H2, the data unit identifier managing device 201 confirms whether an own object to be checked exists or not. If there is an own object to be checked, the processing goes to step H3. If there is no object to be checked, the processing goes to step H5.

In step H3, the data unit referring device 602 confirms whether the loading and erasing data unit is linked with the object to be checked. If the loading and erasing data unit is linked with the object to be checked, the processing goes to step H4. If the loading and erasing data unit is not linked with the object to be checked, the processing goes to step H2.

In step H4, the load erasing registration managing device 210, the data unit deleting device 303, the message generating device 501 and the message transmitting device 502 determine the loading and erasing data unit, and carry out the load erasing processing according to the contents. After step H4, the processing goes to step H2.

In step H5, the information processing system terminates the load erasing processing.

Each data unit includes a combination of a plurality of attributes and the attribute values corresponding to the attributes. The link pointer of other data unit linked with each data unit is also managed as one of the attributes. Users of the information processing system can modify the link pointer of the data unit via the input/output device 100.

In this way, since the system records the next data unit after positively deleting the data unit which has been already recorded in the terminal, it can prevent the terminal from delaying or stopping of the processing operation due to the shortage of memory.

When the data unit stored in the storage device 400 exceeds the predetermined storage capacity, the data unit regarding unnecessary divided area separated from the user's location can be deleted.

Embodiment 13.

Figure 32:
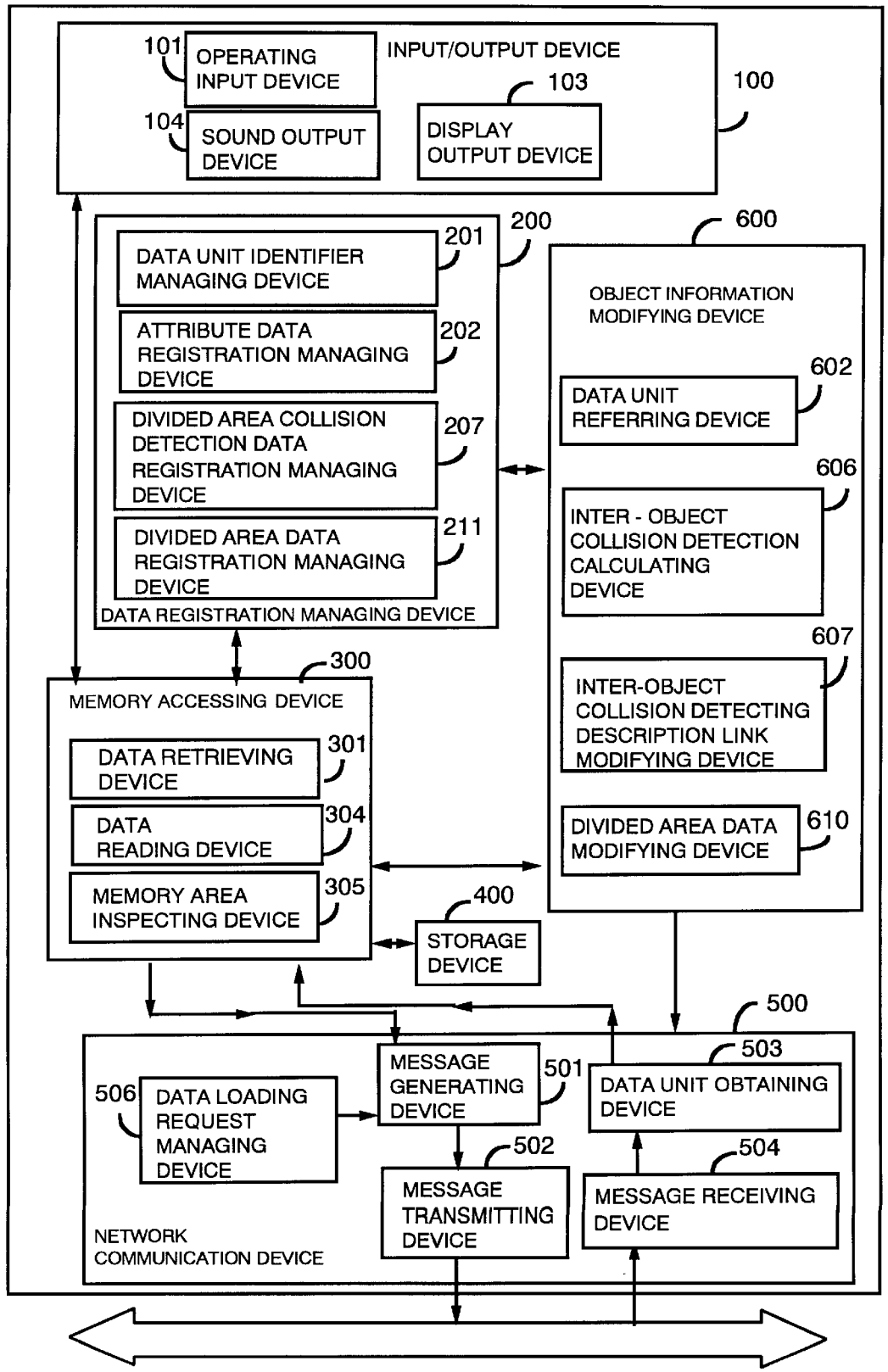
FIG. 32 shows another information processing system of the present invention.

A further embodiment of the present invention is described below using FIG. 32. FIG. 32 shows an information processing system or a network type information processing system according to a thirteenth embodiment.

In FIG. 32, a divided area data modifying device 610 is provided in the object information modifying device 600. The divided area data unit modifying device 610 carries out the following four kinds of processing and renews the linked data unit at the predetermined timing according to the data units such as coordinate, shape, color and material regarding the objects in the virtual three dimensional space.

The four kinds of processing are a processing for generating a scene, a processing for combining a plurality of scenes into one scene, a processing for dividing one scene into a plurality of scenes and a processing for deleting arbitrary scenes.

A divided area data registration managing device 211 is provided in the data registration managing device 200, and registers and manages each data unit renewed by the divided area data registration managing device 211.

In the thirteenth embodiment in FIG. 32, since the same or corresponding portions in the first embodiment in FIG. 1A have the same numbers, their detailed description are omitted and the differences between FIG. 32 and FIG. 1A are only described.

Figure 33:
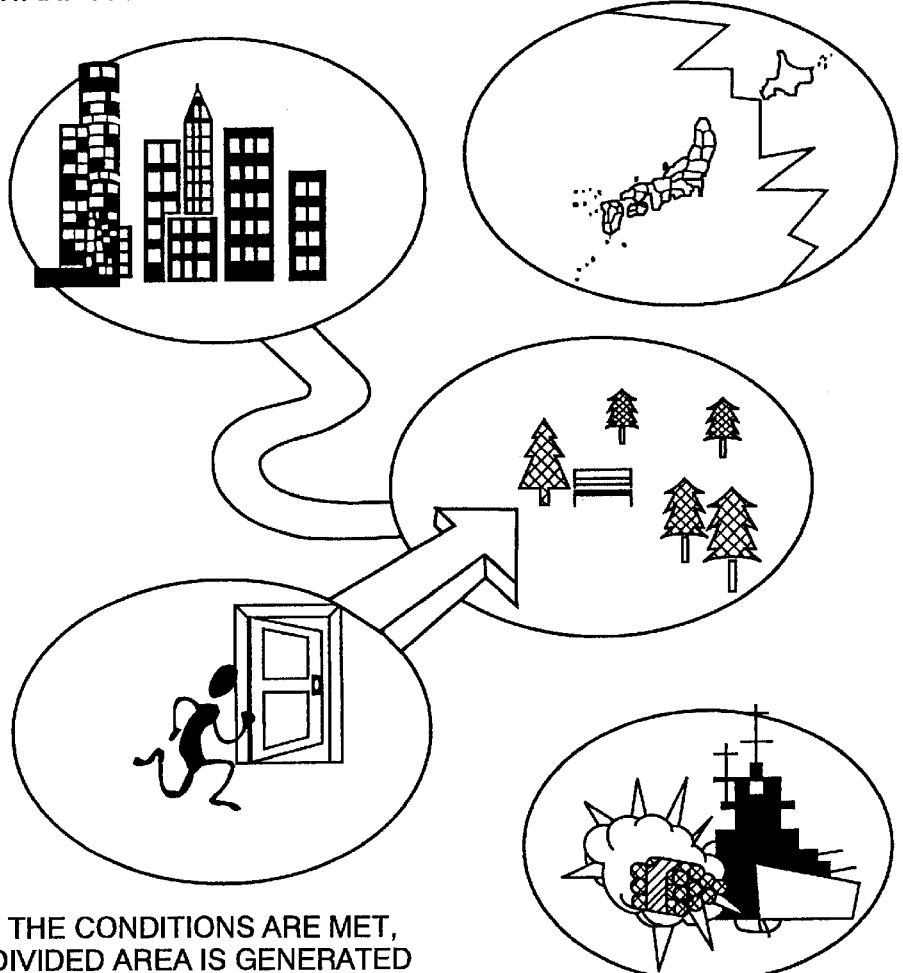
FIG. 33 is a conceptual diagram regarding various control for dividing areas.

A processing system, such as an amusement facility by which the users can tour in the virtual three dimensional space, for generating, combining, dividing and deleting the divided area based on the conditions of the motion data unit, is described below using FIG. 33.

The processing for generating, combining, dividing and deleting the divided areas are carried out, if the system meets the conditions such that the user of the information processing system operates the object by the input button such as the device pointer, or the objects in the virtual three dimensional space meet a predetermined conditions.

The processing for generating, combining, dividing and deleting the divided areas in the virtual three dimensional space are periodically carried out by timer interruption with a short time interval. The processing in response to the timer interruption is branch of the processing request in the main loop as shown in the flowchart of FIG. 3C.

The motion data unit regarding the processing for generating, combining, dividing and deleting divided areas which are one of the timer interruption processing is described below using the flowchart of FIG. 34.

In step I 1, the information processing system begins the processing corresponding to the divided area controlling description. After step I 1, the processing goes to step I 2.

In step I 2, the data unit identifier managing device 201 confirms whether an own object to be checked exists or not. If there is an own object to be checked, the processing goes to step I 3. If there is no object to be checked, the processing goes to step I 5.

In step I 3, the data unit referring device 602 confirms whether the divided area control data unit regarding the processing for generating, combining, dividing and deleting divided areas is linked with the object to be checked or not. If the divided area control data unit is linked with the object to be checked, the processing goes to step I 4. If the loading and erasing data unit is not linked with the object to be checked, the processing goes to step I 2.

In step I 4, the divided area data registration managing device 211, the data reading device 304, the message generating device 501 and the message transmitting device 502 determine the divided area controlling data unit, and carry out the processing according to the divided area controlling data unit. After step I 4, the processing goes to step I 2.

In step I 5, the information processing system terminates the processing based on the divided area controlling data unit.

Each data unit comprises a plurality of attributes and the combination of the attribute values matching with the attributes. The link pointer of other data unit linked with each data unit is also managed as one of the attributes.

The users of the information processing system can change the link pointer of the data unit via the input/output device 100.

In this way, it can be easily realized to generate, combine, divide and delete any scenes without rewriting all of the data file.

Embodiment 14.

Figure 35:
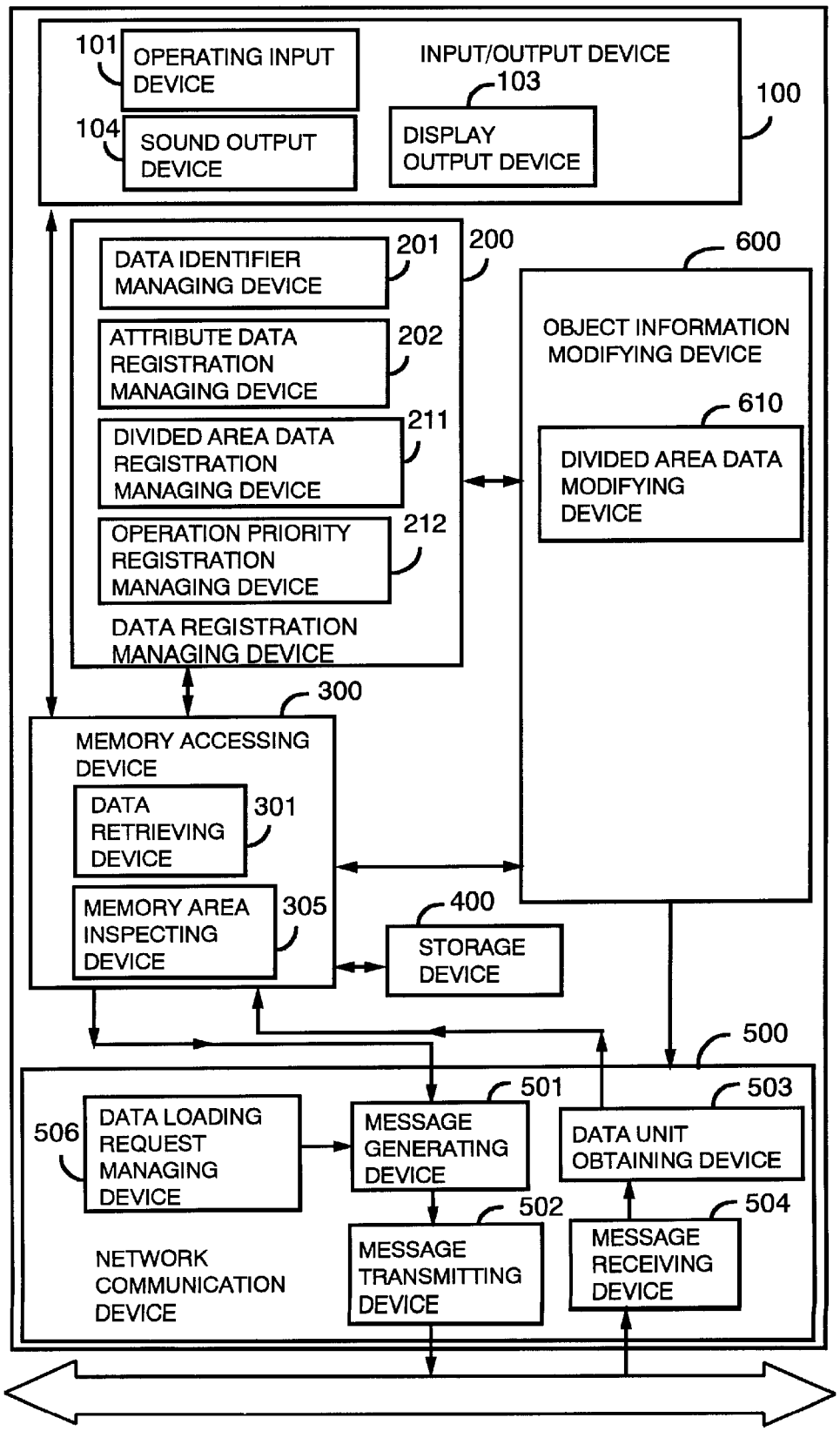
FIG. 35 shows another information processing system of the present invention.

A further embodiment of the present invention is described below using FIG. 35. FIG. 35 shows an information processing system or the network type information processing system according to a fourteenth embodiment.

In FIG. 35, an operation priority registration managing device 212 is provided in the data registration managing device 200. The priority is decided according to whether the divided area data unit modifying device 610 is permitted to generate, combine, separate and delete the divided area, where the data unit regarding the objects in the virtual three dimensional space is set, according to the licenses, qualification and classes of the users, during the operation of the system.

In the fourteenth embodiment in FIG. 35, since the same or corresponding portions in the thirteenth embodiment in FIG. 32 have the same numbers, their detailed description are omitted and the differences between FIG. 35 and FIG. 32 are only described.

The operational priority data unit to which the operation priority registration managing device 212 refers in order to indicate the operational priority is described below using FIG. 36.

Figure 34:
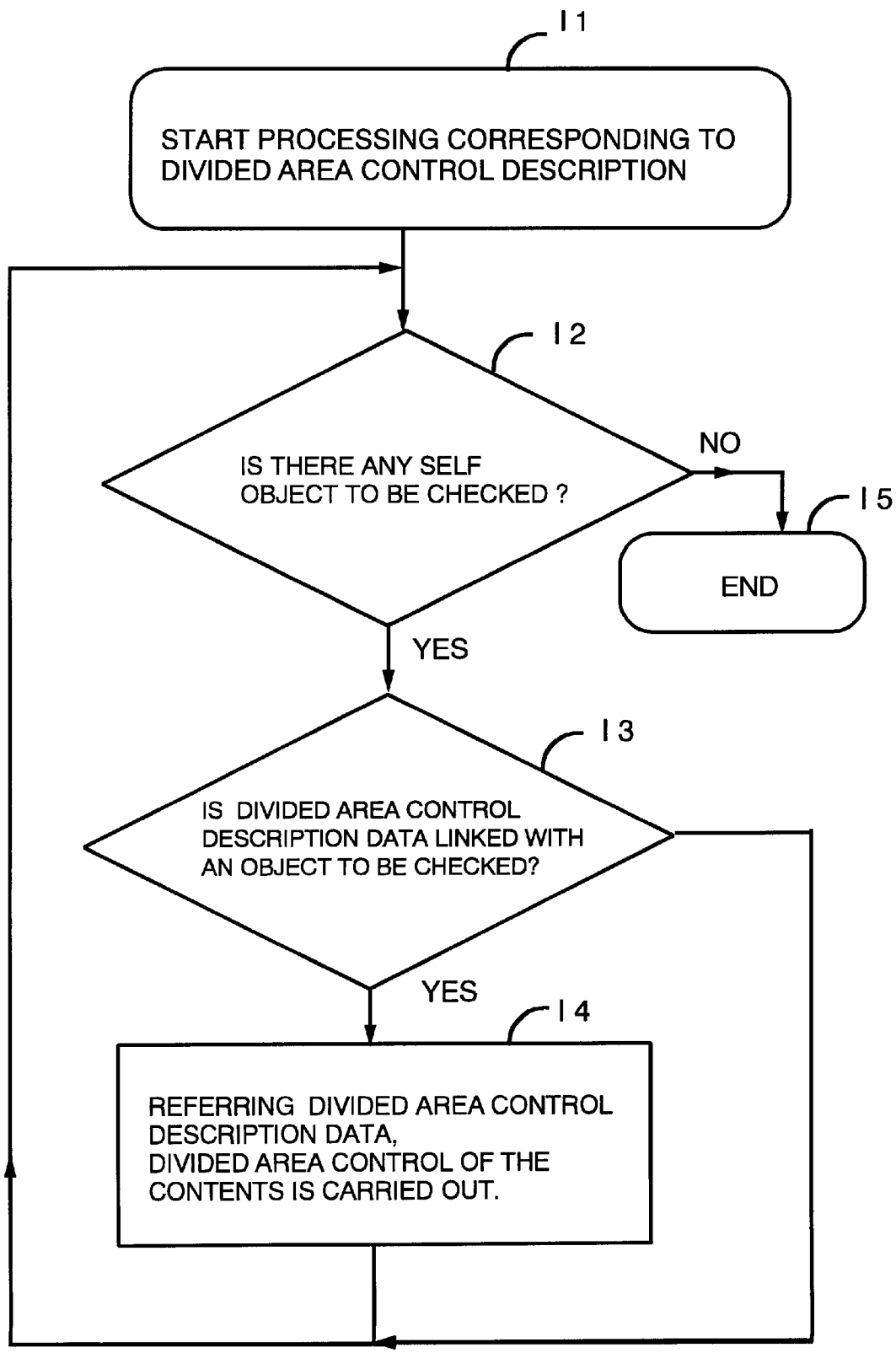
FIG. 34 is a flowchart showing a processing sequence regarding various control for dividing areas.

In the fourteenth embodiment, a step is added for deciding whether the processing of generating, combining, separating and deleting can be carried out during the processing based on the divided area control data unit in the flowchart in FIG. 34.

The operation priority data unit is also set as one of the combination between the attributes and the attribute value set in each data unit. The operation priority data unit is set by the system manager.

In this way, by limiting the operators who can carry out the processing of generating, combining, separating and deleting, reliability can be increased in the information processing system and in the network type information processing system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An information processing system comprising:

input means for receiving object data which describes an object;

data registration managing means for extracting a plurality of data units from the object data, each data unit defining a different characteristic of said object, and generating linked data which links the plurality of data units to each other;

a storage device for recording said plurality of data units, said storage device storing said plurality of data units as separate data files so that an object characteristic may be modified by accessing the data file for the corresponding data unit without accessing data files for other data units;

memory accessing means for accessing the linked plurality of data units stored in said storage device; and an output device for outputting said object based on the linked plurality of data units recorded in said storage device.

2. The information processing system of claim 1, wherein the plurality of data units include different image features and different identifiers; and said data registration managing means extracts the plurality of data units form the object data based on the different identifiers.

3. The information processing system of claim 2, wherein the different identifiers include languages for describing the object data.

4. The information processing system of claim 2, wherein said plurality of data units include at least one of: a shape data unit defining object shape, a material data unit defining object material, a partial background data unit defining a partial object background, a motion data unit defining object motion, a processing data unit defining processing according to motion of said object, and a light source data unit regarding a light source of irradiating light on the object.

5. The information processing system of claim 4, wherein the shape data unit includes coordinates and a shape of the object.

6. An information processing system comprising:

input means for receiving first and second object data;

data registration managing means for extracting a first data unit from the first object data and a second data unit from the second object data and forming first linked data for linking the first data unit and the second data unit to each other in the first data unit and the second data unit, respectively;

a storage device for recording the linked first data unit and the second data unit as separate data files so that an object characteristic may be modified by accessing the data file for the corresponding data unit without accessing the data file for the other data unit; and an output device for retrieving the linked first data unit and second data unit and outputting the first object based on the linked first data unit and the second data unit recorded in said storage device.

7. An information processing system, comprising:

input means for inputting first object data and second object data; and data registration managing means for extracting a first shape data unit and a first motion data unit from the first object data and extracting a second shape data unit and a second motion data unit from the second object data, forming first linked data for linking the first shape data unit and the first or second motion data unit in the first shape data unit and the first or second motion data unit, recording the first shape data unit, the first or second motion data unit and the second shape data unit in a storage device, and outputting the first or second object based on the linked first shape data unit recorded in the storage device, the first or second motion data unit and the second shape data unit.

8. The information processing system of claim 7, wherein said data registration managing means modifies a link of the first shape data unit from the first motion data unit to the second motion data unit according to time, or modifies the link of the first shape data unit from the second motion data unit to the first motion data unit according to time, records the first shape data unit whose link is modified, and the first or second motion data unit linked to the first shape data unit, and outputs the first or second object to an output device, based on the first shape data unit recorded in the storage device by linking the first or second motion data units.

9. The information processing system of claim 8, wherein said data registration managing means associates a processing data unit for detecting whether the first and second objects output to an output device contact each other based on the first and the second shape data units.

10. The information processing system of claim 4, wherein said data registration managing means associates a first partial background data unit, a first shape data unit and a motion data unit extracted from the object data together, moves a first object based on the first shape data unit according to the motion data unit, in a first partial background based on the first partial background data unit, and outputs a second partial background based on a second partial background data unit to said output device, by associating the second partial background data unit, which is extracted from the object data for indicating the second partial background based on the moved position, with the first shape data unit, when the first object is moved to a desired position in the first partial background.

11. A network type information processing system including at least two of said information processing systems of claim 7, wherein the at least two of said information processing systems are connected to each other via a network;

the first data unit regarding the first object recorded in a storage device of a first of said at least two information processing systems is recorded in a storage device of a second of said at least two information processing systems; and the first object is displayed by an output device of the second of said at least two information processing systems based on the first data unit recorded in the storage device of the second of said at least two information processing systems.

12. A network type information processing system including at least two of said information processing systems of claim 6, wherein the at least two of said information processing systems are connected to each other via network wherein the first data unit regarding the first object recorded in a storage device of a first of said at least two information processing systems is recorded in a storage device of a second of said at least two information processing systems; and the first object is displayed by an output device of the second of said at least two information processing systems based on the first data unit recorded in the storage device of the second of said at least two information processing systems.

13. A network type information processing system including at least two of said information processing systems of claim 1 further comprising:

data unit identifier managing means for managing all of the object data to be used by dividing the object data into desired size areas, and for assigning an identifier to each respective data area, an identifier of a respective terminal and an attribute indicating an information processor type to the respective data; and data loading request managing means for querying data which does not exist in an area of the own starting terminal to a server or another terminal, when necessary, and for loading the necessary data from the server or other terminal in response to an answer from the query.

14. The network type information processing system according to claim 13 further comprising:

attribute data registration managing means for adding, referring to, or changing attribute data representing various features of the respective objects to/from the object data such as three dimensional model data, sound source data, text data and image data; and data retrieving means for retrieving desired object data by providing a condition of specific attribute information.

15. The network type information processing system according to claim 13 further comprising:

object modifying information calculation means for carrying out a modification processing of the object data in virtual space displayed on respective terminals;

synchronous communication request managing means for generating a communication message for synchronizing each shared virtual space between terminals;

data unit modifying processing information communication managing means for instructing a transmission and reception of processing information of the modified data in virtual space; and object information modification managing means for managing whether to internally calculate the data modification in the virtual space, modify the data in a manner as reported from other terminal, or modify the data from the synchronized communication information.

16. The network type information processing system according to claim 14 further comprising:

data transmitting interval managing means for adjusting or modifying a transmitting interval of an updated data unit according to a plurality of attribute levels corresponding to real time responses indicating a length of the synchronous timing when the modified data of objects in a virtual space are transmitted.

17. The network type information processing system according to claim 14 further comprising:

motion data registration managing means for separating motion description object data of an object in a virtual space as independent data, and for managing the separated data;

data unit referring means for referring to motion description object data by making a link between the data of object data and the motion description object data, and for examining the object data;

object modifying information calculation means for calculating the motion of the object based on the referred motion object description data; and object motion description link modifying means for dynamically modifying the motion of the object by adding, modifying, or deleting links.

18. The network type information processing system according to claim 17 further comprising:

collision detecting description data registration managing means for managing objects by referring object data through the link from collision judgment description object data between a plurality of objects in the virtual space, or by referring own object data from the collision judgment description object data;

inter-object collision detecting calculation means for evaluating inter-object collision description object data, and for calculating an influence of a subsequent collision; and inter-object collisions detecting description link modifying means for dynamically modifying collision judgement between the plurality of the objects by adding, modifying, or deleting links.

19. The network type information processing system according to claim 17 further comprising:

indicated distance detecting description data registration managing means for determining distances between objects and users in the virtual space, and for loading and displaying data in plural levels according to characteristics of the objects; and coordinate detecting means for detecting a location when the loaded data is displayed.

20. The network type information processing system according to claim 14 further comprising:

indicating object operating position detecting means for selecting an object by pointing to a display area of the object on the display screen of a three dimensional virtual space using a pointer device;

browser output means for storing linked object data as one of attribute data of the object data, and for displaying hyper-linked description object data by starting a browser program for displaying the hyper-linked description object data, according to a specific mode indicated by the pointer device; and browser data registration managing means for adding a destination of the hyper-link to be browsed and a description for dynamically changing a browsing type according to various conditions.

21. The network type information processing system according to claim 17 further comprising:

divided area collision detecting description data registration managing means for managing objects by determining description object data of the collision judgment between a plurality of objects in the virtual reality via link from a specific divided area in each space;

inter-object collision detecting calculation means for evaluating inter-object collision description object data, and for calculating an influence of subsequent collisions; and inter-object collision detecting description link modifying means for dynamically modifying collision judgement between the plurality of the objects for every divided area by adding, modifying, or deleting links.

22. The network type information processing system according to claim 17 further comprising:

scene setting collision detecting description data registration managing means for managing the objects by determining own object data including at least one of positional coordinates, shape, color and material in the virtual space and description object data of collision judgment between a plurality of objects via information objects corresponding to a specific scene in the virtual space;

inter-object collision detecting calculation means for evaluating inter-object collision description object data for every scene, and for calculating an influence of subsequent collisions; and inter-object collision detecting description link modifying means for dynamically modifying collision judgement between a plurality of the objects, by adding, modifying, or deleting links.

23. The network type information processing system according to claim 17 further comprising:

scheduling means for managing data such as coordinates, shape, color and material of the objects in the virtual space, motion description object data, inter-object collision judgment description object data, area information and scene information, on a time axis, and for deciding a timing when such data is used; and scheduling information modifying means for changing scheduling information when necessary, and for dynamically changing the use of information corresponding to a respective time period.

24. The network type information processing system according to claim 14 further comprising:

loading and erasing registration managing means for managing object-related data in a virtual space by a desired data unit, and for managing description object data for dynamically loading and erasing separately as same as the object data itself while said network type information processing system is operating; and loading and erasing request managing means for checking conditional portions of the description object data for loading and erasing at predetermined timing, and for notifying said memory accessing means when conditions of the conditional portions are met.

25. The network type information processing system according to claim 14 further comprising:

divided area data registration managing means for managing the description object data for generating, coupling, separating or erasing separately as same as the object data itself, when characteristics of objects in a virtual space meet predetermined conditions; and divided area data modifying means for checking a conditional portion of description object data for generating, coupling, separating or erasing in a predetermined timing, and for generating, coupling, separating, or erasing the description object data when the conditions are met.

26. The network type information processing system according to claim 25 further comprising:

operation priority registration managing means for registering and managing an operating ability for generating, coupling, separating, or erasing the divided areas, and for deciding whether said divided area data modifying means are dynamically generating, coupling, separating, or erasing the divided areas where the object-related data is located in the virtual space, according to licenses, qualification or classes of users, via said memory accessing means.

27. An information processing system comprising:

a memory for storing a plurality of data units which together describe an object, each data unit defining a different characteristic of said object and being linked to at least one other data unit for said object, said memory storing said plurality of data units as separate data files so that an object characteristic may be modified by accessing the data file for the corresponding data unit without accessing data files for other data units; and an output device for accessing and outputting said object based on the linked plurality of data units stored in said memory.

28. The information processing system according to claim 27, wherein said object is an object in multi-dimensional virtual space.

29. An information processing method comprising:

storing a plurality of data units which together describe an object in memory, each data unit defining a different characteristic of said object and being linked to at least one other data unit for said object, said memory storing said plurality of data units as separate data files so that an object characteristic may be modified by accessing the data file for the corresponding data unit without accessing data files for other data units; and accessing and outputting said object based on the linked plurality of data units stored in said memory.

* * * * *